US011363235B2

(12) United States Patent
Awai

(10) Patent No.: US 11,363,235 B2
(45) Date of Patent: Jun. 14, 2022

(54) IMAGING APPARATUS, IMAGE PROCESSING APPARATUS, AND IMAGE PROCESSING METHOD

(71) Applicant: Sony Corporation, Tokyo (JP)

(72) Inventor: Shoichi Awai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/754,745

(22) PCT Filed: Oct. 3, 2018

(86) PCT No.: PCT/JP2018/036965
§ 371 (c)(1),
(2) Date: Apr. 9, 2020

(87) PCT Pub. No.: WO2019/077999
PCT Pub. Date: Apr. 25, 2019

(65) Prior Publication Data
US 2020/0322571 A1    Oct. 8, 2020

(30) Foreign Application Priority Data

Oct. 16, 2017  (JP) .............................. JP2017-200212

(51) Int. Cl.
*H04N 7/18*       (2006.01)
*H04N 7/04*       (2006.01)
*G06T 7/73*       (2017.01)

(52) U.S. Cl.
CPC ................ *H04N 7/04* (2013.01); *G06T 7/73* (2017.01); *H04N 7/18* (2013.01); *G06T 2207/30252* (2013.01)

(58) Field of Classification Search
CPC ........ H04N 7/04; H04N 7/18; H04N 21/2146; H04N 21/440245; H04N 21/4728;
(Continued)

(56) References Cited

U.S. PATENT DOCUMENTS

| 9,628,660 B2 * | 4/2017 | Kim ...................... H04N 1/2166 |
| 2004/0136574 A1 * | 7/2004 | Kozakaya .......... G06K 9/00228 |
| | | 382/118 |

(Continued)

FOREIGN PATENT DOCUMENTS

| JP | 7-288806 A | 10/1995 |
| JP | 2006-197194 A | 7/2006 |

(Continued)

OTHER PUBLICATIONS

Yoon et al. Low Bit Rate Video coding with implicit Multiscale Segmentation, Oct. 7, 1999, IEEE vol. 9, No. 7.*

(Continued)

*Primary Examiner* — Gims S Philippe
(74) *Attorney, Agent, or Firm* — Xsensus LLP

(57) ABSTRACT

The present technology relates to an imaging apparatus, an image processing apparatus, and an image processing method that can reduce an amount of transfer of images.

The imaging apparatus includes: an imaging unit that performs imaging to obtain a captured image; and a transmission control unit that performs transmission control to transmit a region image within a plurality of transfer regions, which corresponds to an entire or partial region of the captured image, at a frame rate set for each of the transfer regions. The present technology can be applied to, for example, a camera that images the surroundings of a mobile body such as a camera that images the surroundings of a vehicle that performs automated driving.

18 Claims, 12 Drawing Sheets

(58) Field of Classification Search
CPC ..... H04N 21/234381; H04N 21/23418; H04N 21/234345; G06T 7/73; G06T 2207/30252
USPC .......................................................... 348/148
See application file for complete search history.

(56) References Cited

U.S. PATENT DOCUMENTS

| | | | |
|---|---|---|---|
| 2012/0236927 A1* | 9/2012 | Nakagawa | H04N 21/234381 375/240.01 |
| 2012/0319928 A1 | 12/2012 | Rhodes | |
| 2015/0189236 A1* | 7/2015 | Oike | H04N 7/152 348/14.07 |
| 2016/0212434 A1* | 7/2016 | Tsukagoshi | H04N 19/70 |
| 2017/0267178 A1 | 9/2017 | Shiga et al. | |
| 2018/0324475 A1* | 11/2018 | Usami | H04N 21/234345 |
| 2019/0280770 A1* | 9/2019 | Hicks | H04B 10/116 |

FOREIGN PATENT DOCUMENTS

| | | |
|---|---|---|
| JP | 2009-27564 A | 2/2009 |
| JP | 2015-5843 A | 1/2015 |

OTHER PUBLICATIONS

Badescu et al. Comparison Between Multiline Transmission ans Diverging Wave Imaging: Assessment of Image Quality and Motion Estimation Accuracy, Oct. 10, 2019, IEEE vol. 66, No. 10.*
Extended European Search Report dated Jun. 24, 2020, issued in corresponding European Patent Application No. 18868534.1.
Sek M Chai et al: "Streaming I/O for Imaging Applications", Computer Architecture for Machine Perception, 2005. Camp 2005. Proceedings. Seventh International Workshop on Palermo, Italy Jul. 4-6, 2005, Piscataway, NJ, USA.IEEE, Los Alamitos, CA, USA, Jul. 4, 2005 (Jul. 4, 2005), pp. 178-183, XP010835502.
International Search Report and Written Opinion dated Dec. 25, 2018 for PCT/JP2018/036965 filed on Oct. 3, 2018, 10 pages including English Translation of the International Search Report.

* cited by examiner

IMAGING APPARATUS, IMAGE PROCESSING APPARATUS, AND IMAGE PROCESSING METHOD

CROSS-REFERENCE TO RELATED APPLICATIONS

The present application is based on PCT filing PCT/JP2018/036965, filed Oct. 3, 2018, which claims priority to JP 2017-200212, filed Oct. 16, 2017, the entire contents of each are incorporated herein by reference.

TECHNICAL FIELD

The present technology relates to an imaging apparatus, an image processing apparatus, and an image processing method, and more particularly to an imaging apparatus, an image processing apparatus, and an image processing method that can reduce the amount of transfer of images.

BACKGROUND ART

A vehicle that performs automated driving is assumed to be provided with a large number of imaging apparatuses in order to recognize the surrounding situation accurately and in detail.

Meanwhile, the resolution and frame rate of the imaging apparatuses have been improved in recent years, and measures for increase in the processing speed and increase in the amount of data are being studied (for example, see Patent Document 1).

CITATION LIST

Patent Document

Patent Document 1: Japanese Patent Application Laid-Open No. 2006-197194

SUMMARY OF THE INVENTION

Problems to be Solved by the Invention

Therefore, it is predicted in the future that the amount of data of images imaged by each imaging apparatus will be further increased, and that the capacity and transfer rate required for a bus or the like used for image transfer will be further increased.

The present technology has been made in view of such circumstances, and is intended to be able to reduce the amount of transfer of images.

Solutions to Problems

An imaging apparatus according to a first aspect of the present technology includes: an imaging unit that performs imaging to obtain a captured image; and a transmission control unit that performs transmission control to transmit a region image within a plurality of transfer regions, which corresponds to an entire or partial region of the captured image, at a frame rate set for each of the transfer regions.

In an image processing method according to the first aspect of the present technology, the imaging apparatus performs imaging to obtain the captured image, and performs transmission control to transmit the region image within the plurality of transfer regions, which corresponds to the entire or partial region of the captured image, at the frame rate set for each of the transfer regions.

An image processing apparatus according to a second aspect of the present technology includes: a region setting unit that sets a plurality of transfer regions, which corresponds to an entire or partial region of a captured image imaged by an imaging apparatus, on the basis of at least one of an object or a feature point within the captured image; a frame rate setting unit that sets a frame rate of each of the transfer regions; a transmission control unit that controls transmission of region setting information to the imaging apparatus, the region setting information being related to each of the transfer regions and the frame rate of each of the transfer regions; and a reception control unit that controls reception of a region image within each of the transfer regions transmitted from the imaging apparatus at a frame rate based on the region setting information.

In an image processing method according to the second aspect of the present technology, the image processing apparatus sets the plurality of transfer regions, which corresponds to the entire or partial region of the captured image imaged by the imaging apparatus, on the basis of at least one of the object or the feature point within the captured image, sets the frame rate of each of the transfer regions, controls transmission of the region setting information, which is related to each of the transfer regions and the frame rate of each of the transfer regions, to the imaging apparatus, and controls reception of the region image within each of the transfer regions transmitted from the imaging apparatus at the frame rate based on the region setting information.

In the first aspect of the present technology, the captured image is imaged, and the region image within the plurality of transfer regions, which corresponds to the entire or partial region of the captured image, is transmitted at the frame rate set for each of the transfer regions.

In the second aspect of the present technology, the plurality of transfer regions, which corresponds to the entire or partial region of the captured image imaged by the imaging apparatus, is set on the basis of at least one of the object or the feature point within the captured image, the frame rate of each of the transfer regions is set, the region setting information related to each of the transfer regions and the frame rate of each of the transfer regions is transmitted to the imaging apparatus, and the region image within each of the transfer regions, which is transmitted from the imaging apparatus at the frame rate based on the region setting information, is received.

Effects of the Invention

According to the first aspect or the second aspect of the present technology, the amount of transfer of images can be reduced.

Note that the present technology has an effect not necessarily limited to the one described herein, but may have any effect described in the present disclosure.

MODES FOR CARRYING OUT THE INVENTION

Modes for carrying out the present technology will be described below. The description will be made in the following order.

1. Example of configuration of vehicle control system
2. First Embodiment
3. Second Embodiment
4. Variation
5. Other

1. Example of Configuration of Vehicle Control System

Figure 1:
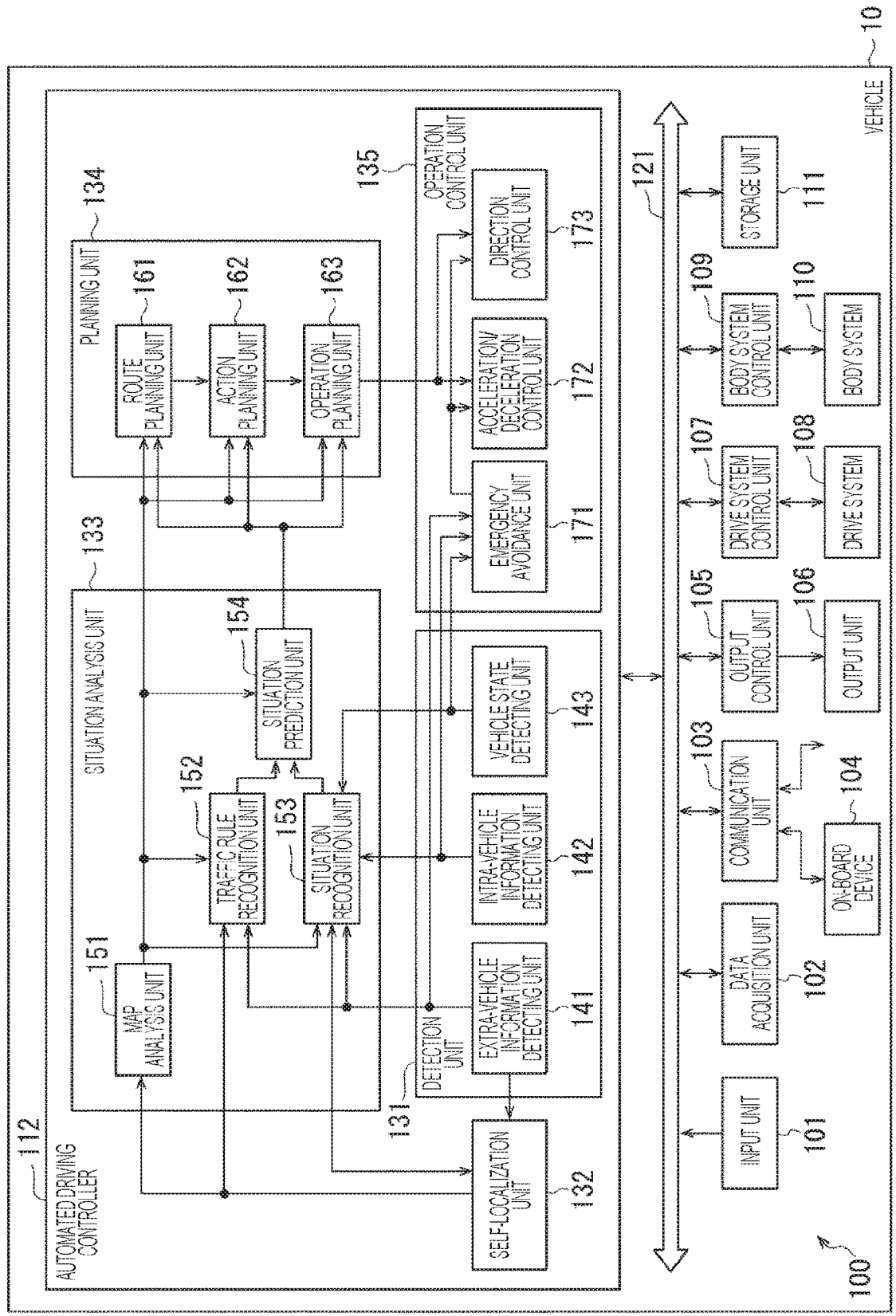
FIG. 1 is a block diagram illustrating an example of the configuration of general functions of a vehicle control system to which the present technology can be applied.

FIG. 1 is a block diagram illustrating an example of the configuration of general functions of a vehicle control system 100 that is an example of a mobile body control system to which the present technology can be applied.

The vehicle control system 100 is a system that is provided in a vehicle 10 and performs various controls of the vehicle 10. Note that the vehicle 10 will be hereinafter referred to as a vehicle of the system in a case where the vehicle 10 is to be distinguished from another vehicle.

The vehicle control system 100 includes an input unit 101, a data acquisition unit 102, a communication unit 103, an on-board device 104, an output control unit 105, an output unit 106, a drive system control unit 107, a drive system 108, a body system control unit 109, a body system 110, a storage unit 111, and an automated driving controller 112. The input unit 101, the data acquisition unit 102, the communication unit 103, the output control unit 105, the drive system control unit 107, the body system control unit 109, the storage unit 111, and the automated driving controller 112 are connected to one another via a communication network 121. The communication network 121 includes an in-vehicle communication network, a bus, or the like in conformance with an arbitrary standard such as a Controller Area Network (CAN), a Local Interconnect Network (LIN), a Local Area Network (LAN), or FlexRay (registered trademark), for example. Note that the units of the vehicle control system 100 are connected directly without the communication network 121 in some cases.

Note that in the following, the communication network 121 will not be mentioned in a case where the units of the vehicle control system 100 perform communication via the communication network 121. For example, in a case where the input unit 101 and the automated driving controller 112 perform communication via the communication network 121, it will simply be described that the input unit 101 and the automated driving controller 112 perform communication.

The input unit 101 includes a device used by an occupant to input various data, instructions, and the like. For example, the input unit 101 includes an operation device such as a touch panel, a button, a microphone, a switch, or a lever, an operation device that enables input by a method other than manual operation such as by voice or a gesture, or the like. Alternatively, for example, the input unit 101 may be a remote control device using infrared rays or other radio waves, or an external connected device such as a mobile device or a wearable device supporting the operation of the vehicle control system 100. The input unit 101 generates an input signal on the basis of data, an instruction, or the like input by an occupant and supplies the input signal to each unit of the vehicle control system 100.

The data acquisition unit 102 includes various sensors and the like that acquire data used for processing of the vehicle control system 100, and supplies the acquired data to each unit of the vehicle control system 100.

For example, the data acquisition unit 102 includes various sensors that detect a state of the vehicle 10 and the like. Specifically, for example, the data acquisition unit 102 includes a gyro sensor, an acceleration sensor, an inertial measurement unit (IMU), and a sensor that detects an amount of operation on a gas pedal, an amount of operation on a brake pedal, a steering angle of a steering wheel, an engine speed, a motor speed, a rotational speed of wheels, or the like.

Moreover, for example, the data acquisition unit 102 includes various sensors that detect information outside the vehicle 10. Specifically, for example, the data acquisition unit 102 includes an imaging apparatus such as a Time of Flight (ToF) camera, a stereo camera, a monocular camera, an infrared camera, or other cameras. Furthermore, for example, the data acquisition unit 102 includes an environment sensor that detects climate or weather and the like, and a surrounding information sensor that detects an object around the vehicle 10. The environment sensor includes, for example, a raindrop sensor, a fog sensor, a solar radiation sensor, a snow sensor, or the like. The surrounding information sensor includes, for example, an ultrasonic sensor, a radar, Light Detection and Ranging, Laser Imaging Detection and Ranging (LiDAR), a sonar, or the like.

Moreover, for example, the data acquisition unit 102 includes various sensors that detect a current position of the vehicle 10. Specifically, for example, the data acquisition unit 102 includes a Global Navigation Satellite System (GNSS) receiver or the like that receives a GNSS signal from a GNSS satellite.

Moreover, for example, the data acquisition unit 102 includes various sensors that detect information inside a vehicle. Specifically, for example, the data acquisition unit 102 includes an imaging apparatus that images a driver, a biosensor that detects biometric information of a driver, a microphone that collects sound inside a vehicle, or the like. The biosensor is provided on, for example, a seat surface, a steering wheel, or the like and detects biometric information of an occupant sitting in the seat or a driver holding the steering wheel.

The communication unit 103 communicates with the on-board device 104 and various devices, a server, a base station, and the like outside the vehicle, thereby transmitting data supplied from each unit of the vehicle control system 100 and supplying received data to each unit of the vehicle control system 100. Note that the communication protocol supported by the communication unit 103 is not particularly limited, and the communication unit 103 can support a plurality of types of communication protocols as well.

For example, the communication unit 103 performs wireless communication with the on-board device 104 by a wireless LAN, Bluetooth (registered trademark), Near Field Communication (NFC), wireless USB (WUSB), or the like. Also, for example, the communication unit 103 performs wired communication with the on-board device 104 by a Universal Serial Bus (USB), High-Definition Multimedia Interface (HDMI (registered trademark)), Mobile High-definition Link (MHL), or the like via a connection terminal (and a cable if necessary) not shown.

Furthermore, for example, the communication unit 103 communicates with a device (for example, an application server or a control server) existing on an external network (for example, the Internet, a cloud network, or an operator-specific network) via a base station or an access point. Also, for example, the communication unit 103 uses a Peer To Peer (P2P) technology to communicate with a terminal (for example, a terminal held by a pedestrian or placed in a store, or a Machine Type Communication (MTC) terminal) that is in the vicinity of the vehicle 10. Also, for example, the communication unit 103 performs V2X communication such as vehicle-to-vehicle communication, vehicle-to-infrastructure communication, communication between the vehicle 10 and a home (vehicle-to-home communication), and vehicle-to-pedestrian communication. Moreover, for example, the communication unit 103 includes a beacon receiver to receive radio waves or electromagnetic waves transmitted from a wireless station or the like installed on a road, and acquire information on a current position, traffic jam, traffic regulation, required time, or the like.

The on-board device 104 includes, for example, a mobile device or wearable device that is possessed by an occupant, an information device that is carried into or attached in the vehicle 10, a navigation device that searches for a route to an arbitrary destination, or the like.

The output control unit 105 controls the output of various information to an occupant of the vehicle 10 or the outside of the vehicle. For example, the output control unit 105 generates an output signal including at least one of visual information (for example, image data) or auditory information (for example, audio data), supplies the output signal to the output unit 106, and controls the output of the visual information and/or auditory information from the output unit 106. Specifically, for example, the output control unit 105 generates a bird's eye image, a panoramic image, or the like by combining image data imaged by different imaging apparatuses of the data acquisition unit 102, and supplies an output signal including the generated image to the output unit 106. Moreover, for example, the output control unit 105 generates audio data including a warning sound, a warning message, or the like for danger such as a collision, contact, or entry into a dangerous zone, and supplies an output signal including the generated audio data to the output unit 106.

The output unit 106 includes a device capable of outputting visual information or auditory information to an occupant of the vehicle 10 or the outside of the vehicle. For example, the output unit 106 includes a display device, an instrument panel, an audio speaker, headphones, a wearable device such as a glasses-type display worn by an occupant, a projector, a lamp, or the like. The display device included in the output unit 106 may be a device having a normal display or also be, for example, a device that displays visual information within a driver's field of view such as a head-up display, a transmissive display, or a device having an Augmented Reality (AR) display function.

The drive system control unit 107 controls the drive system 108 by generating various control signals and supplying them to the drive system 108. The drive system control unit 107 also supplies a control signal to each unit other than the drive system 108 as necessary, and provides notification of a control state of the drive system 108 and the like.

The drive system 108 includes various devices related to the drive system of the vehicle 10. For example, the drive system 108 includes a driving power generator that generates driving power such as an internal combustion engine or a driving motor, a driving power transmission mechanism that transmits the driving power to wheels, a steering mechanism that adjusts a steering angle, a braking device that generates a braking force, an Antilock Brake System (ABS), an Electronic Stability Control (ESC), an electric power steering device, and the like.

The body system control unit 109 controls the body system 110 by generating various control signals and supplying them to the body system 110. The body system control unit 109 also supplies a control signal to each unit other than the body system 110 as necessary, and provides notification of a control state of the body system 110 and the like.

The body system 110 includes various devices of the body system that are mounted to a vehicle body. For example, the body system 110 includes a keyless entry system, a smart key system, a power window device, a power seat, a steering wheel, an air conditioner, various lamps (for example, a head lamp, a back lamp, a brake lamp, a turn signal, a fog lamp, and the like), and the like.

The storage unit 111 includes, for example, a Read Only Memory (ROM), a Random Access Memory (RAM), a magnetic storage device such as a Hard Disc Drive (HDD), a semiconductor storage device, an optical storage device, a magneto-optical storage device, and the like. The storage unit 111 stores various programs, data, and the like used by each unit of the vehicle control system 100. For example, the storage unit 111 stores map data including a three-dimensional high-precision map such as a dynamic map, a global map having lower precision than the high-precision map but covering a wide area, a local map containing information around the vehicle 10, and the like.

The automated driving controller 112 performs control related to automated driving such as autonomous driving or driving assistance. Specifically, for example, the automated driving controller 112 performs cooperative control for the purpose of implementing the functions of an Advanced Driver Assistance System (ADAS) including collision avoidance or impact mitigation for the vehicle 10, travel following a vehicle ahead, constant speed travel, or a collision warning for the vehicle 10 based on the distance between vehicles, a warning for the vehicle 10 going off the lane, and the like. Also, for example, the automated driving controller 112 performs cooperative control for the purpose of automated driving or the like that enables autonomous driving without depending on a driver's operation. The automated driving controller 112 includes a detection unit 131, a self-localization unit 132, a situation analysis unit 133, a planning unit 134, and an operation control unit 135.

The detection unit 131 detects various information necessary for controlling automated driving. The detection unit 131 includes an extra-vehicle information detecting unit 141, an intra-vehicle information detecting unit 142, and a vehicle state detecting unit 143.

The extra-vehicle information detecting unit 141 performs processing of detecting information outside the vehicle 10 on the basis of data or a signal from each unit of the vehicle control system 100. For example, the extra-vehicle information detecting unit 141 performs processings of detecting, recognizing, and tracking an object around the vehicle 10, and processing of detecting the distance to the object. The object to be detected includes, for example, a vehicle, a person, an obstacle, a structure, a road, a traffic light, a traffic sign, a road marking, or the like. Also, for example, the extra-vehicle information detecting unit 141 performs processing of detecting an ambient environment of the vehicle 10. The ambient environment to be detected includes, for example, weather, temperature, humidity, brightness, road surface condition, or the like. The extra-vehicle information detecting unit 141 supplies data indicating a result of the detection processing to the self-localization unit 132, a map analysis unit 151, a traffic rule recognition unit 152, and a situation recognition unit 153 of the situation analysis unit 133, an emergency avoidance unit 171 of the operation control unit 135, and the like.

The intra-vehicle information detecting unit 142 performs processing of detecting information inside the vehicle on the basis of data or a signal from each unit of the vehicle control system 100. For example, the intra-vehicle information detecting unit 142 performs processings of authenticating and recognizing a driver, processing of detecting a state of the driver, processing of detecting an occupant, processing of detecting an environment inside the vehicle, or the like. The state of the driver to be detected includes, for example, a physical condition, a level of being awake, a level of concentration, a level of fatigue, a line-of-sight direction, or the like. The environment inside the vehicle to be detected includes, for example, temperature, humidity, brightness, smell, or the like. The intra-vehicle information detecting unit 142 supplies data indicating a result of the detection processing to the situation recognition unit 153 of the situation analysis unit 133, the emergency avoidance unit 171 of the operation control unit 135, and the like.

The vehicle state detecting unit 143 performs processing of detecting a state of the vehicle 10 on the basis of data or a signal from each unit of the vehicle control system 100. The state of the vehicle 10 to be detected includes, for example, speed, acceleration, a steering angle, presence/absence and details of abnormality, a state of driving operation, power seat position and inclination, a state of door lock, a state of another on-board device, or the like. The vehicle state detecting unit 143 supplies data indicating a result of the detection processing to the situation recognition unit 153 of the situation analysis unit 133, the emergency avoidance unit 171 of the operation control unit 135, and the like.

The self-localization unit 132 performs processing of estimating a position, an orientation, and the like of the vehicle 10 on the basis of data or a signal from each unit of the vehicle control system 100 such as the extra-vehicle information detecting unit 141 and the situation recognition unit 153 of the situation analysis unit 133. The self-localization unit 132 also generates a local map (hereinafter referred to as a self-localization map) used for self-localization as necessary. The self-localization map is, for example, a high-precision map using a technique such as Simultaneous Localization and Mapping (SLAM). The self-localization unit 132 supplies data indicating a result of the estimation processing to the map analysis unit 151, the traffic rule recognition unit 152, and the situation recognition unit 153 of the situation analysis unit 133, and the like. The self-localization unit 132 also causes the storage unit 111 to store the self-localization map.

The situation analysis unit 133 performs processing of analyzing a situation of the vehicle 10 and the surroundings. The situation analysis unit 133 includes the map analysis unit 151, the traffic rule recognition unit 152, the situation recognition unit 153, and a situation prediction unit 154.

The map analysis unit 151 performs processing of analyzing various maps stored in the storage unit 111 while using, as necessary, data or a signal from each unit of the vehicle control system 100 such as the self-localization unit 132 and the extra-vehicle information detecting unit 141, and constructs a map that contains information necessary for automated driving processing. The map analysis unit 151 supplies the constructed map to the traffic rule recognition unit 152, the situation recognition unit 153, the situation prediction unit 154, a route planning unit 161, an action planning unit 162, and an operation planning unit 163 of the planning unit 134, and the like.

The traffic rule recognition unit 152 performs processing of recognizing a traffic rule in the vicinity of the vehicle 10 on the basis of data or a signal from each unit of the vehicle control system 100 such as the self-localization unit 132, the extra-vehicle information detecting unit 141, the map analysis unit 151, and the like. This recognition processing allows for the recognition of, for example, a position and a state of a traffic light in the vicinity of the vehicle 10, details of traffic regulations in the vicinity of the vehicle 10, a lane in which the vehicle can travel, or the like. The traffic rule recognition unit 152 supplies data indicating a result of the recognition processing to the situation prediction unit 154 and the like.

The situation recognition unit 153 performs processing of recognizing a situation related to the vehicle 10 on the basis of data or a signal from each unit of the vehicle control system 100 such as the self-localization unit 132, the extra-vehicle information detecting unit 141, the intra-vehicle information detecting unit 142, the vehicle state detecting unit 143, and the map analysis unit 151. For example, the situation recognition unit 153 performs processing of recognizing a situation of the vehicle 10, a situation around the vehicle 10, a situation of the driver of the vehicle 10, or the like. The situation recognition unit 153 also generates a local map (hereinafter referred to as a situation recognition map) used for the recognition of the situation around the vehicle 10 as necessary. The situation recognition map is, for example, an occupancy grid map.

The situation of the vehicle 10 to be recognized includes, for example, the position, orientation, and movement (for example, the speed, acceleration, direction of travel, or the like) of the vehicle 10, the presence/absence and details of abnormality, or the like. The situation around the vehicle 10 to be recognized includes, for example, the type and position of a surrounding stationary object, the type, position, and movement (for example, the speed, acceleration, direction of travel, or the like) of a surrounding mobile object, the configuration and surface conditions of a surrounding road, and ambient weather, temperature, humidity, brightness, and the like. The state of the driver to be recognized includes, for example, a physical condition, a level of being awake, a level of concentration, a level of fatigue, a line-of-sight movement, a driving operation, or the like.

The situation recognition unit 153 supplies data (including the situation recognition map as necessary) indicating a result of the recognition processing to the self-localization unit 132, the situation prediction unit 154, and the like. The situation recognition unit 153 also causes the storage unit 111 to store the situation recognition map.

The situation prediction unit 154 performs processing of predicting a situation related to the vehicle 10 on the basis of data or a signal from each unit of the vehicle control system 100 such as the map analysis unit 151, the traffic rule recognition unit 152, and the situation recognition unit 153. For example, the situation prediction unit 154 performs processing of predicting a situation of the vehicle 10, a situation around the vehicle 10, a situation of the driver, or the like.

The situation of the vehicle 10 to be predicted includes, for example, a behavior of the vehicle 10, occurrence of abnormality, a distance the vehicle can travel, or the like. The situation around the vehicle 10 to be predicted includes, for example, a behavior of a mobile object around the vehicle 10, a change in state of a traffic light, a change in the environment such as weather, or the like. The situation of the driver to be predicted includes, for example, a behavior, a physical condition, or the like of the driver.

The situation prediction unit 154 supplies data indicating a result of the prediction processing to the route planning unit 161, the action planning unit 162, and the operation planning unit 163 of the planning unit 134 and the like together with the data from the traffic rule recognition unit 152 and the situation recognition unit 153.

The route planning unit 161 plans a route to a destination on the basis of data or a signal from each unit of the vehicle control system 100 such as the map analysis unit 151 and the situation prediction unit 154. For example, the route planning unit 161 sets a route from a current position to a designated destination on the basis of the global map. Also, for example, the route planning unit 161 changes the route as appropriate on the basis of a situation such as a traffic jam, an accident, traffic regulations, or construction, a physical condition of the driver, or the like. The route planning unit 161 supplies data indicating the planned route to the action planning unit 162 and the like.

The action planning unit 162 plans an action of the vehicle 10 in order for the vehicle to travel the route planned by the route planning unit 161 safely within the planned time, on the basis of data or a signal from each unit of the vehicle control system 100 such as the map analysis unit 151 and the situation prediction unit 154. For example, the action planning unit 162 performs planning for start, stop, a direction of travel (for example, a forward movement, backward movement, left turn, right turn, change of direction, or the like), a driving lane, a driving speed, passing, or the like. The action planning unit 162 supplies data indicating the planned action of the vehicle 10 to the operation planning unit 163 and the like The operation planning unit 163 plans an operation of the vehicle 10 to achieve the action planned by the action planning unit 162, on the basis of data or a signal from each unit of the vehicle control system 100 such as the map analysis unit 151 and the situation prediction unit 154. For example, the operation planning unit 163 performs planning for acceleration, deceleration, a path of travel, or the like. The operation planning unit 163 supplies data indicating the planned operation of the vehicle 10 to an acceleration/ deceleration control unit 172 and a direction control unit 173 of the operation control unit 135 and the like.

The operation control unit 135 controls the operation of the vehicle 10. The operation control unit 135 includes the emergency avoidance unit 171, the acceleration/deceleration control unit 172, and the direction control unit 173.

The emergency avoidance unit 171 performs processing of detecting an emergency such as a collision, contact, entry into a dangerous zone, abnormality of the driver, or abnormality of the vehicle 10 on the basis of results of detection by the extra-vehicle information detecting unit 141, the intra-vehicle information detecting unit 142, and the vehicle state detecting unit 143. In a case where the emergency avoidance unit 171 has detected the occurrence of an emergency, the emergency avoidance unit 171 plans an operation of the vehicle 10 for avoiding the emergency such as a sudden stop or steep turn. The emergency avoidance unit 171 supplies data indicating the planned operation of the vehicle 10 to the acceleration/deceleration control unit 172, the direction control unit 173, and the like.

The acceleration/deceleration control unit 172 performs acceleration/deceleration control for achieving the operation of the vehicle 10 planned by the operation planning unit 163 or the emergency avoidance unit 171. For example, the acceleration/deceleration control unit 172 calculates a control target value for the driving power generator or braking device to achieve the planned acceleration, deceleration, or sudden stop, and supplies a control command indicating the calculated control target value to the drive system control unit 107.

The direction control unit 173 performs direction control for achieving the operation of the vehicle 10 planned by the operation planning unit 163 or the emergency avoidance unit 171. For example, the direction control unit 173 calculates a control target value for the steering mechanism to achieve the path of travel or steep turn planned by the operation planning unit 163 or the emergency avoidance unit 171, and supplies a control command indicating the calculated control target value to the drive system control unit 107.

2. First Embodiment

Next, a first embodiment of the present technology will be described with reference to FIGS. 2 to 10.

Note that the first embodiment relates to the processing of mainly the data acquisition unit 102 and the extra-vehicle information detecting unit 141 of the vehicle control system 100 in FIG. 1.

<Example of Configuration of Extra-Vehicle Information Detection System>

Figure 2:
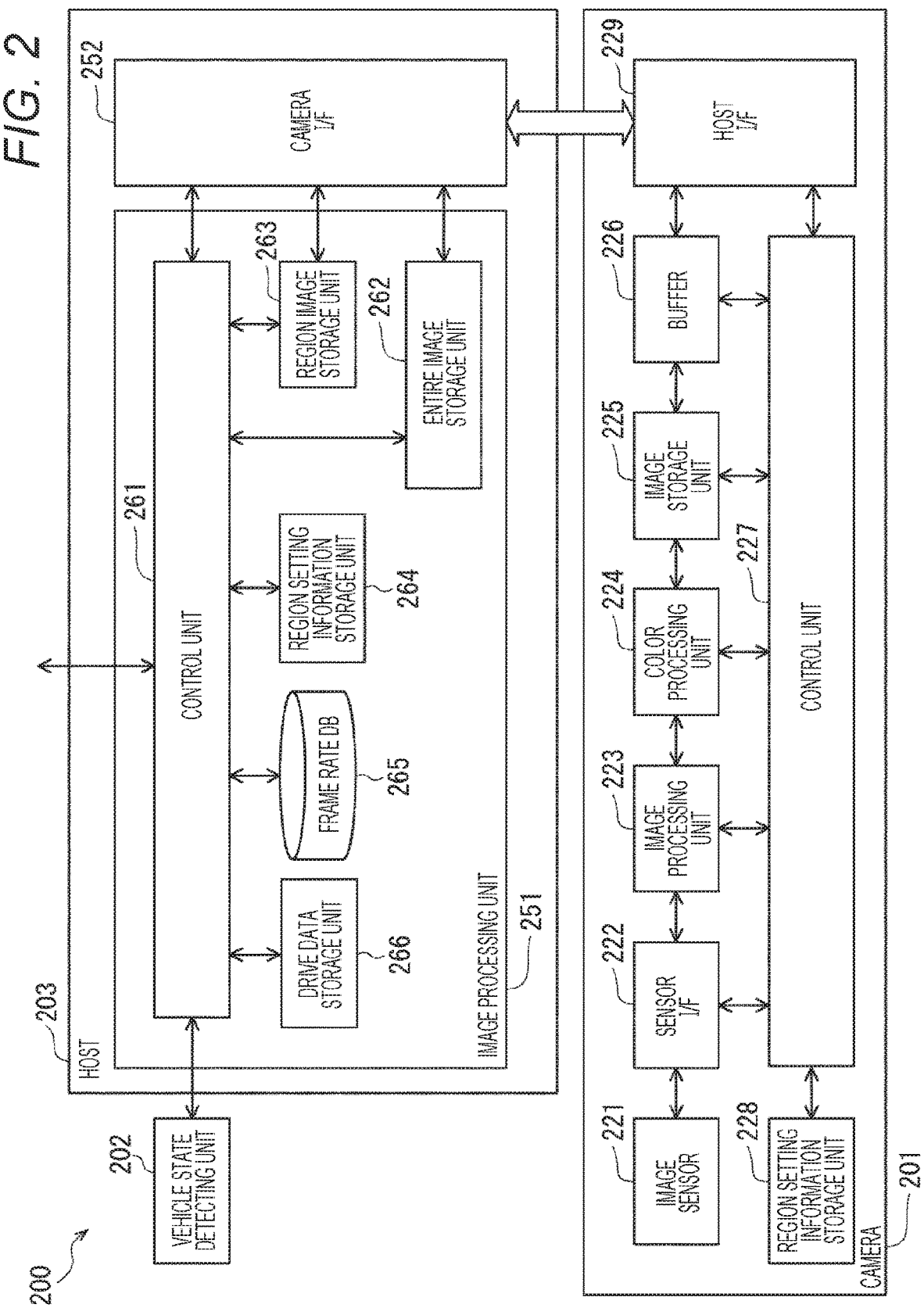
FIG. 2 is a block diagram illustrating an embodiment of an extra-vehicle information detection system to which the present technology is applied.

FIG. 2 is a block diagram illustrating an example of the configuration of an extra-vehicle information detection system 200 that is an embodiment of an extra-vehicle information detection system to which the present technology is applied.

The extra-vehicle information detection system 200 is a system that performs processing of detecting information around the vehicle 10 in which the extra-vehicle information detection system 200 is provided. For example, the extra-vehicle information detection system 200 performs the processing of detecting information around the vehicle 10 on the basis of an image obtained by imaging the surroundings of the vehicle 10 (hereinafter referred to as a surrounding image). Then, the extra-vehicle information detection system 200 supplies data indicating a result of the detection processing to, for example, the self-localization unit 132, the map analysis unit 151, the traffic rule recognition unit 152, the situation recognition unit 153, the emergency avoidance unit 171, and the like in FIG. 1.

The extra-vehicle information detection system 200 includes a camera 201, a vehicle state detecting unit 202, and a host 203.

The camera 201 is installed at a position at which the surroundings of the vehicle 10 can be imaged, and supplies a surrounding image obtained as a result of imaging to the host 203.

The camera 201 includes an image sensor 221, a sensor interface (I/F) 222, an image processing unit 223, a color processing unit 224, an image storage unit 225, a buffer 226, a control unit 227, a region setting information storage unit 228, and a host interface (I/F) 229.

The image sensor 221 is an imaging unit that images the surroundings of the vehicle 10, and uses an image sensor of an arbitrary type such as a CMOS image sensor or a CCD image sensor, for example. The image sensor 221 images the surroundings of the vehicle 10 under the control of the control unit 227 via the sensor I/F 222, and supplies a surrounding image obtained to the sensor I/F 222.

The sensor I/F 222 performs communication between the image sensor 221 and the outside.

The image processing unit 223 performs various types of image processing on the surrounding image under the control of the control unit 227, and supplies the surrounding image obtained after the image processing to the color processing unit 224. The type of image processing performed by the image processing unit 223 is selected as necessary from, for example, defect correction processing, white balance adjustment processing, noise removal processing, and the like.

The color processing unit 224 performs various types of color processing on the surrounding image under the control of the control unit 227, and causes the image storage unit 225 to store the surrounding image obtained after the color processing. The type of color processing performed by the color processing unit 224 is selected as necessary from, for example, demosaicing, resolution conversion processing, γ correction processing, YC conversion processing, and the like.

The image storage unit 225 includes a volatile or non-volatile memory, for example, and stores the surrounding image.

The buffer 226 includes a volatile memory, for example, and temporarily stores an image (hereinafter referred to as a region image) within a region corresponding to the entire or a part of the surrounding image (hereinafter referred to as a transfer region).

Note that hereinafter, the transfer region corresponding to the entire surrounding image will also be referred to as an entire region, and the region image within the entire region (that is, the entire surrounding image) will also be referred to as an entire image.

The control unit 227 includes various processors and the like to control each unit of the camera 201, control transmission/reception of data such as the region image to/from the host 203, and the like, for example.

The region setting information storage unit 228 includes a volatile memory, for example, and stores region setting information transmitted from the host 203. Note that the region setting information is information regarding the transfer region and a frame rate set for each transfer region.

The host I/F 229 is a communication interface with the host 203, and performs communication with a camera I/F of the host 203.

The vehicle state detecting unit 202 corresponds to the vehicle state detecting unit 143 in FIG. 1, for example, and performs processing of detecting a state of the vehicle 10 to supply data indicating a result of the detection processing to a control unit 261 of an image processing unit 251 in the host 203.

The host 203 performs transfer control of the region image from the camera 201, processing of detecting information around the vehicle 10 on the basis of the region image, and the like. The host 203 includes the image processing unit 251 and a camera interface (I/F) 252.

The image processing unit 251 includes the control unit 261, an entire image storage unit 262, a region image storage unit 263, a region setting information storage unit 264, a frame rate database (DB) 265, and a drive data storage unit 266.

The control unit 261 includes various processors and the like, and controls each unit of the host 203, controls transmission/reception of data such as the region image to/from the camera 201, performs the processing of detecting information around the vehicle 10, and the like, for example. The control unit 261 also outputs data indicating a result of the processing of detecting information around the vehicle 10 to the outside.

The entire image storage unit 262 includes a volatile or non-volatile memory, for example, and stores the entire image among the region images transmitted from the camera 201.

The region image storage unit 263 includes a volatile or non-volatile memory, for example, and stores the region images other than the entire image transmitted from the camera 201.

The region setting information storage unit 264 includes a volatile memory, for example, and stores region setting information generated by the control unit 261.

The frame rate DB 265 stores data used for setting a frame rate that indicates a rate (transfer rate) at which the region image within the transfer region is transferred. For example, the frame rate DB 265 stores a method of setting the frame rate, a set value of the frame rate, or the like for conditions such as the type, position, and movement of an object, a state of the vehicle 10, the mounting position and mounting orientation of the camera 201, time, and weather.

The drive data storage unit 266 includes a non-volatile memory, for example, and stores data such as the region image obtained while the vehicle 10 is traveling.

<Example of Configuration of Functions of Control Unit in Camera>

Figure 3:
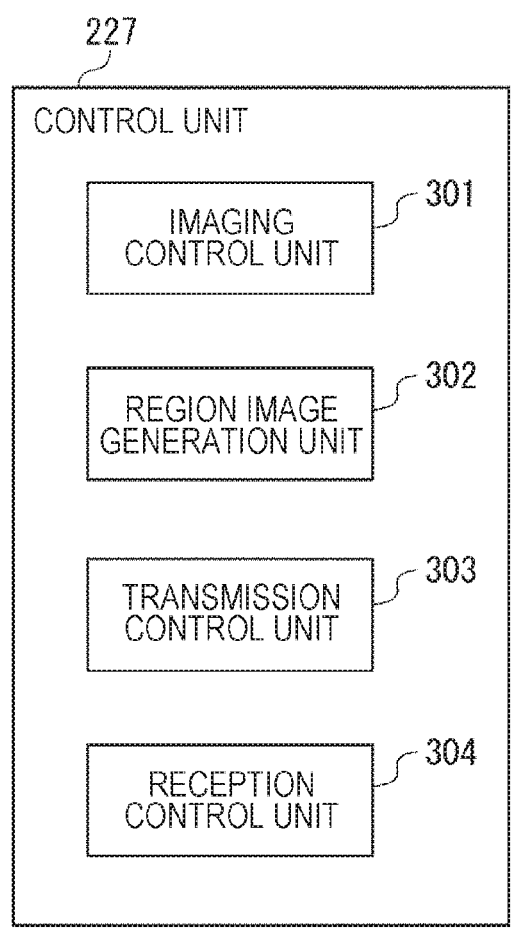
FIG. 3 is a block diagram illustrating an example of the configuration of functions implemented by a control unit of a camera.

FIG. 3 illustrates an example of the configuration of functions of the control unit 227 in the camera 201.

The control unit 227 includes an imaging control unit 301, a region image generation unit 302, a transmission control unit 303, and a reception control unit 304.

The imaging control unit 301 controls the image sensor 221, the image processing unit 223, and the color processing unit 224 to control imaging of the surrounding image.

The region image generation unit 302 generates the region image from the entire image stored in the image storage unit 225 on the basis of the region setting information stored in the region setting information storage unit 228, and causes the buffer 226 to store the region image.

The transmission control unit 303 controls the host I/F 229 to control transmission of data such as the region image to the host 203.

The reception control unit 304 controls the host I/F 229 to control reception of data such as the region setting information from the host 203.

<Example of Configuration of Functions of Control Unit in Host>

Figure 4:
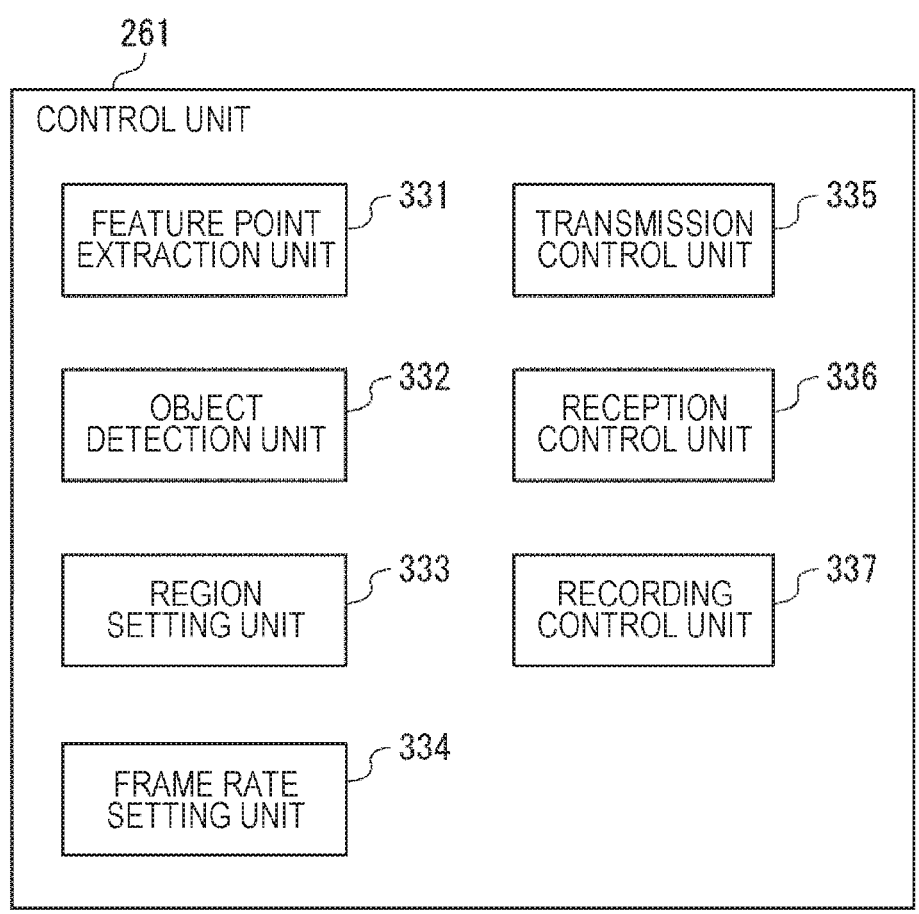
FIG. 4 is a block diagram illustrating an example of the configuration of functions implemented by a control unit of a host.

FIG. 4 illustrates an example of the configuration of functions of the control unit 261 in the host 203.

The control unit 261 includes a feature point extraction unit 331, an object detection unit 332, a region setting unit 333, a frame rate setting unit 334, a transmission control unit 335, a reception control unit 336, and a recording control unit 337.

The feature point extraction unit 331 performs processing of extracting a feature point within the region image.

The object detection unit 332 performs processing of detecting an object within the region image.

The region setting unit 333 sets the transfer region on the basis of at least one of a result of the extraction of a feature point or a result of the detection of an object within the region image. The region setting unit 333 also generates the region setting information related to each transfer region and the frame rate of each transfer region, and causes the region setting information storage unit 264 to store the region setting information or supplies it to the camera I/F 252.

The frame rate setting unit 334 sets the frame rate of each transfer region on the basis of at least one of the result of the extraction of a feature point within the region image, the result of the detection of an object within the region image, or the result of the detection of a state of the vehicle 10 performed by the vehicle state detecting unit 202, and the data stored in the frame rate DB 265.

The transmission control unit 335 controls the camera I/F 252 to control transmission of data such as the region setting information to the camera 201.

The reception control unit 336 controls the camera I/F 252 to control reception of data such as the region image from the camera 201.

The recording control unit 337 controls recording of data, such as the region image obtained while the vehicle 10 is traveling, in the drive data storage unit 266.

<Host Processing>

Next, the processing of the host 203 will be described with reference to a flowchart in FIG. 5. Note that this processing is started when, for example, the vehicle 10 is started and an operation to start driving is performed such as when an ignition switch, a power switch, a start switch, or the like of the vehicle 10 is turned on. Moreover, this processing is ended when, for example, an operation to end driving is performed such as when the ignition switch, the power switch, the start switch, or the like of the vehicle 10 is turned off.

In step S1, the host 203 transmits an imaging start command. Specifically, the transmission control unit 335 generates the imaging start command for causing the camera 201 to start imaging to obtain a surrounding image, and transmits the imaging start command to the camera 201 via the camera I/F 252.

Figure 9:
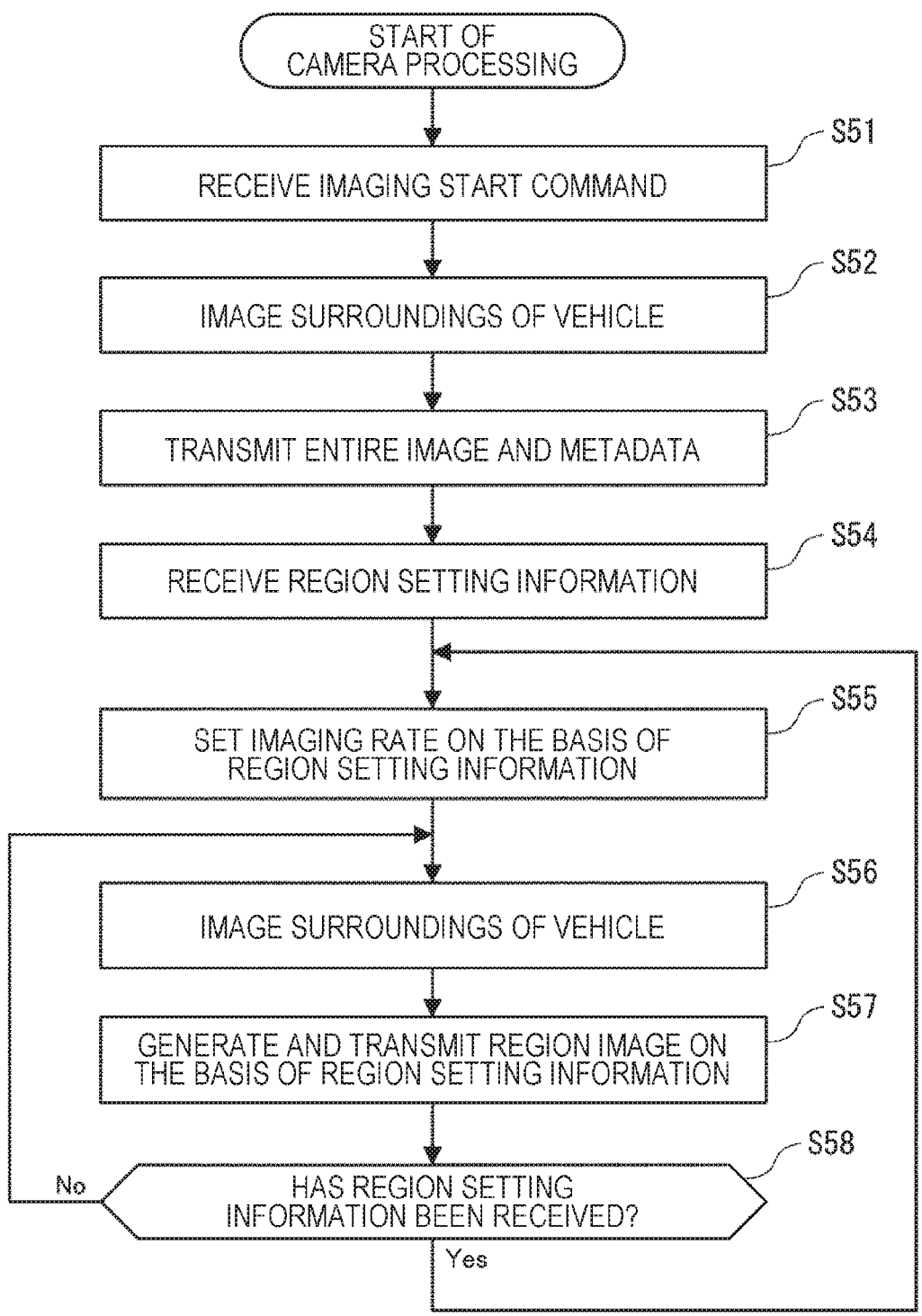
FIG. 9 is a flowchart for explaining camera processing.

On the other hand, the camera 201 receives the imaging start command in step S51 of FIG. 9 described later, images the surroundings of the vehicle 10 in step S52, and transmits an entire image and metadata in step S53.

Note that the metadata includes, for example, the mounting position, mounting orientation, angle of view, exposure parameter, and the like of the camera 201.

In step S2, the host 203 receives the entire image and the metadata. Specifically, the camera I/F 252 receives the entire image and the metadata transmitted from the camera 201 under the control of the reception control unit 336, causes the entire image storage unit 262 to store the entire image, and supplies the metadata to the reception control unit 336.

In step S3, the feature point extraction unit 331 extracts feature points in the entire image stored in the entire image storage unit 262.

Note that for a method of extracting the feature points, an arbitrary method such as Harris corner detection can be used, for example.

In step S4, the region setting unit 333 sets a transfer region on the basis of the feature points. For example, the region setting unit 333 performs clustering of the feature points within the entire image. As a result, the feature points within the entire image are classified into one or more clusters. The region setting unit 333 then sets a region corresponding to each cluster as the transfer region. The region setting unit 333 also sets the entire region as the transfer region.

Figure 6:
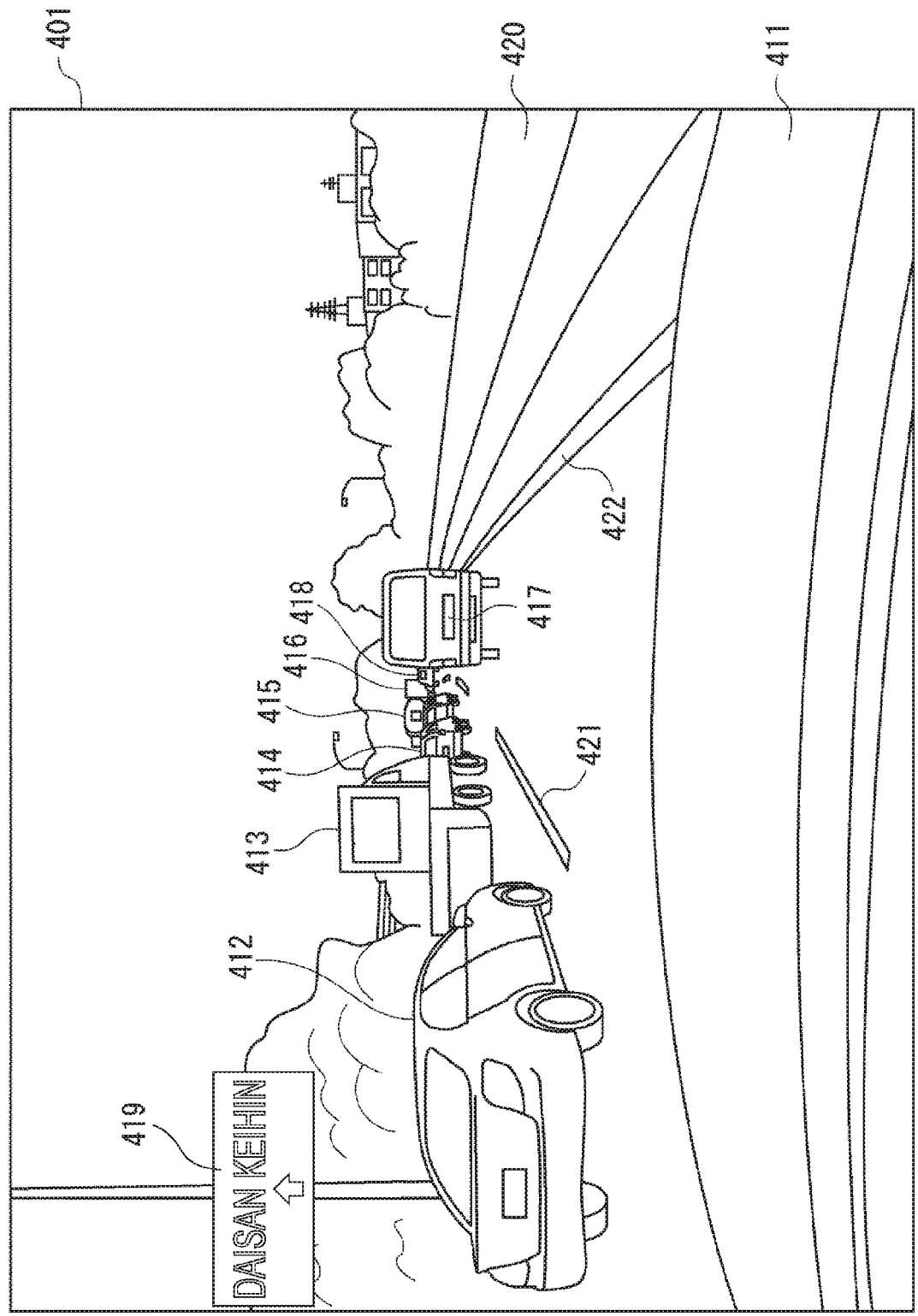
FIG. 6 is a diagram schematically illustrating an example of a surrounding image.

For example, FIG. 6 schematically illustrates an example of a surrounding image 401 obtained by imaging an area in front of the vehicle 10. In this example, a hood 411 of the vehicle 10 is shown in a lower part of the surrounding image 401. Vehicles 412 to 416 are shown ahead in a lane to the left of a driving lane of the vehicle 10. Vehicles 417 and 418 are shown ahead in the driving lane of the vehicle 10. An information sign 419 is shown on a left side of the vehicle 412. A guardrail 420 is shown on a left edge of the road. Lane markers 421 and 422 are shown on the road surface. Woods, buildings, and the like are shown on the left and right sides of the road.

Figure 7:
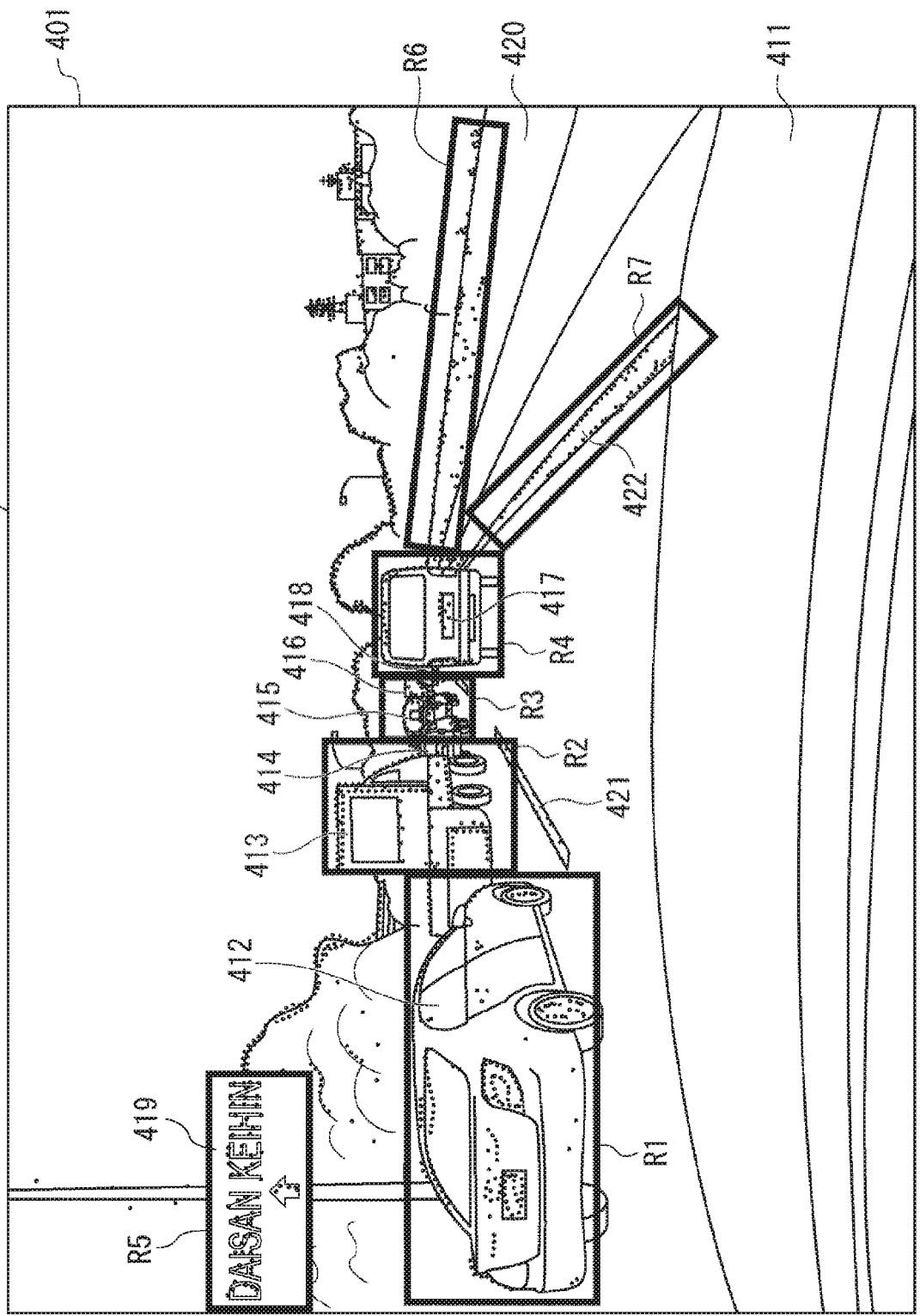
FIG. 7 is a diagram illustrating examples of feature points and transfer regions.

FIG. 7 illustrates examples of feature points and transfer regions in the surrounding image 401 of FIG. 6. Small dots in the figure indicate feature points. For example, many feature points are extracted near the edges and the like of the vehicles 412 to 418, the information sign 419, the guardrail 420, the lane markers 421 and 422, and the woods, buildings, and the like on the left and right sides of the road.

Moreover, on the basis of a result of the clustering of the feature points, transfer regions R1 to R7 are set. The transfer region R1 includes the vehicle 412. The transfer region R2 includes the vehicles 413 and 414. The transfer region R3 includes the vehicles 414 to 416 and 418. The transfer region R4 includes the vehicles 417 and 418. The transfer region R5 includes the information sign 419. The transfer region R6 includes the guardrail 420. The transfer region R7 includes the lane marker 422. Moreover, the entire region of the surrounding image 401 is set as a transfer region R0.

Note that the transfer region is not necessarily limited to a rectangular region having sides parallel to sides of the perimeter of the entire image but may be, for example, a rectangle tilted with respect to the sides of the perimeter of the entire image such as the transfer regions R6 and R7. Moreover, the transfer region need not necessarily be a rectangle.

In step S5, the object detection unit 332 performs the processing of detecting an object within each transfer region. For example, the object detection unit 332 detects the type, position, movement, or the like of an object within each transfer region.

Note that an arbitrary method such as semantic segmentation can be used as a method of detecting the type, position, movement, or the like of an object, for example.

In step S6, the frame rate setting unit 334 sets the frame rate of each transfer region.

Specifically, the frame rate setting unit 334 acquires a result of the detection of a state of the vehicle 10 from the vehicle state detecting unit 202. The frame rate setting unit 334 then sets the frame rate of each transfer region on the basis of a result of the detection of an object within each transfer region (for example, at least one of the type, position, or movement of an object), the result of the detection of a state of the vehicle 10, and data stored in the frame rate DB 265.

For example, the frame rate of each transfer region is set on the basis of the necessity of paying attention to an object within each transfer region (hereinafter referred to as necessity of attention). For example, the frame rate is set higher as the necessity of attention to an object within the transfer region is higher, and the frame rate is set lower as the necessity of attention to an object within the transfer region is lower.

The necessity of attention to an object is determined on the basis of the type of an object, for example. For example, the necessity of attention to a mobile object is determined to be higher than that to a stationary object.

Figure 8:
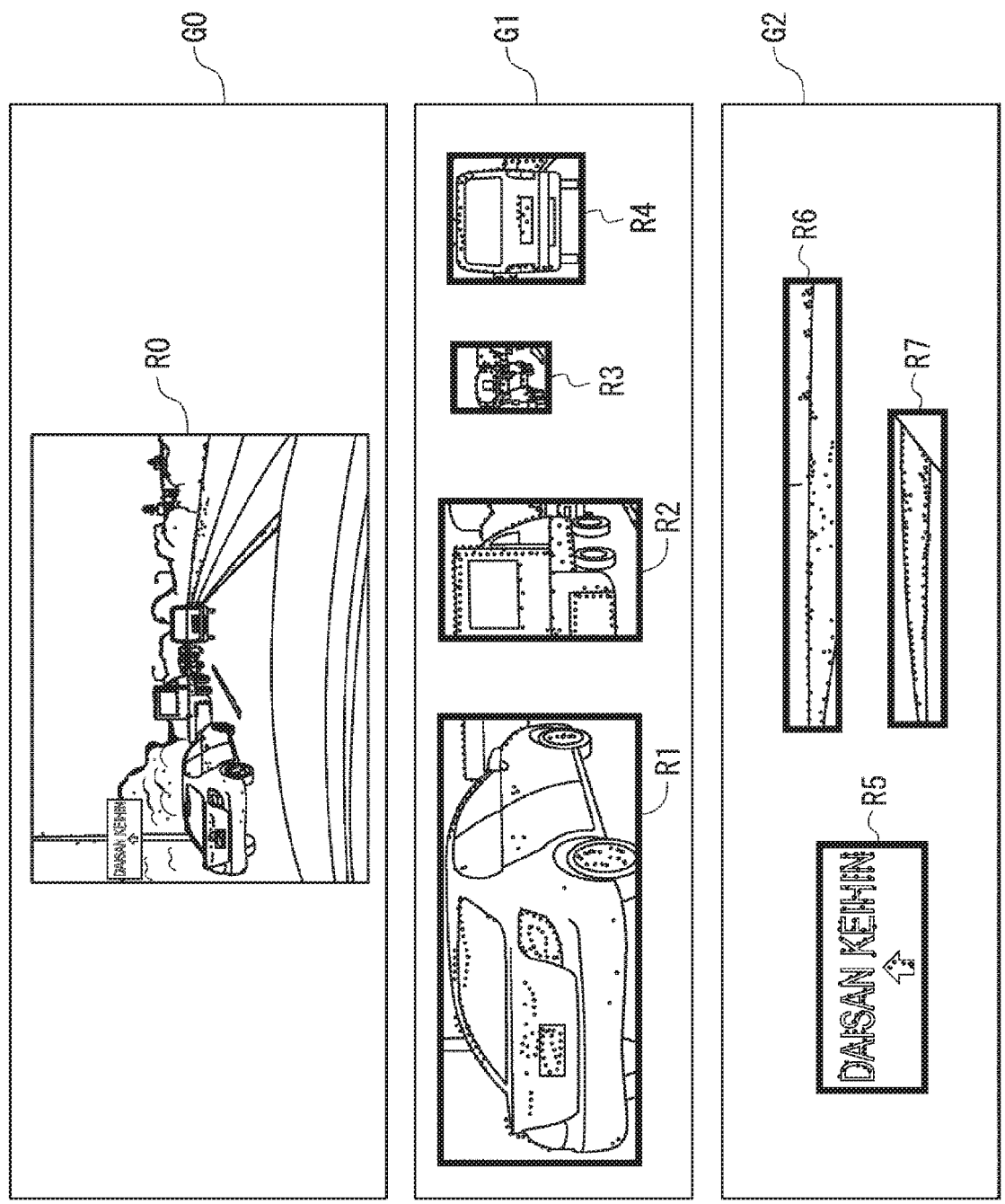
FIG. 8 is a diagram for explaining an example of a method of setting a frame rate of the transfer region.

As illustrated in FIG. 8, for example, the transfer regions R1 to R7 are classified into groups G1 and G2 depending on whether or not a mobile object is included. The transfer regions R1 to R4 each including a mobile object are classified into the group G1. The transfer regions R5 to R7 each not including a mobile object and including only a stationary object are classified into the group G2. Then, the frame rate of the transfer region in the group G1 is set higher than that of the transfer region in the group G2. For example, the frame rate of the transfer region in the group G1 is set to 120 frames per second (fps), and the frame rate of the transfer region in the group G2 is set to 60 fps.

Note that a group G0 includes the transfer region R0 that is the entire region. The frame rate of the transfer region R0 is set to be lower than or equal to the lowest frame rate among the frame rates of the other transfer regions. For example, the frame rate of the transfer region R0 is set to be lower than or equal to 60 fps that is the frame rate of the transfer region in the group G2.

Note that the frame rate may be set more specifically by subdividing the type of an object into a vehicle, bicycle, pedestrian, road sign, and the like, for example. In this case, for example, the necessity of attention is determined to be higher as the general average speed of an object within the transfer region is faster, and the frame rate is set to be higher. On the other hand, the necessity of attention is determined to be lower as the general average speed of an object within the transfer region is slower, and the frame rate is set to be lower. For example, the frame rate is set in the order of the transfer region including a vehicle>the transfer region including a bicycle>the transfer region including a pedestrian>the transfer region including a road sign.

In this case, for example, the frame rate is set on the basis of the average speed of an object such that the region image including the object is transferred every time the object moves by a predetermined distance (for example, 10 cm).

Note that in a case where the region image is used for self-localization of the vehicle 10 such as SLAM, for example, the necessity of attention to a stationary object that is more likely to be used for self-localization is determined to be higher than that to a mobile object that is less likely to be used for self-localization. Then, the frame rate of the transfer region including only a stationary object is set to be higher than that of the transfer region including a mobile object.

Also, the necessity of attention to an object may be determined on the basis of a level of risk that an object collides with or comes into contact with the vehicle 10 (hereinafter simply referred to as a level of risk of an object), for example.

For example, the level of risk of each object is determined on the basis of at least one of the position or movement of the object with respect to the vehicle 10. For example, the level of risk is determined to be higher for an object moving at a faster relative speed in the direction of approaching the vehicle 10. On the other hand, the level of risk is determined to be lower for an object moving at a slower relative speed in the direction of approaching the vehicle 10, or an object moving at a faster relative speed in the direction away from the vehicle 10.

Furthermore, in a case where there is a possibility that an object collides with or comes into contact with the vehicle 10, for example, the level of risk of each object may be determined on the basis of a predicted collision time. That is, the level of risk is determined to be higher for an object with a shorter predicted collision time, and the level of risk is determined to be lower for an object with a longer predicted collision time.

Then, for example, the frame rate is set higher as the level of risk of an object within the transfer region is higher, and the frame rate is set lower as the level of risk of an object within the transfer region is lower.

In this case, for an object approaching the vehicle 10, for example, the frame rate is set such that the region image including the object is transferred every time the object approaches the vehicle 10 by a predetermined first distance (for example, 10 cm). On the other hand, for an object moving away from the vehicle 10, the frame rate is set such that the region image including the object is transferred every time the object moves away from the vehicle 10 by a second distance (for example, 20 cm) longer than the first distance.

In step S7, the host 203 generates and transmits region setting information. Specifically, the region setting unit 333 generates the region setting information including the position and shape of each transfer region within the surrounding image, and the frame rate of each transfer region. The region setting unit 333 causes the region setting information storage unit 264 to store the region setting information generated. The region setting unit 333 also transmits the region setting information generated to the camera 201 via the camera I/F 252.

On the other hand, the camera 201 receives the region setting information in step S54 of FIG. 9 described later, and generates and transmits a region image on the basis of the region setting information in step S57.

In step S8, the host 203 receives the region image. Specifically, the camera I/F 252 receives the region image transmitted from the camera 201 under the control of the reception control unit 336.

Moreover, in a case where the region image received is the entire image, the camera I/F 252 causes the entire image storage unit 262 to store the entire image. At this time, for example, an old entire image stored in the entire image storage unit 262 is overwritten with the new entire image. On the other hand, in a case where the region image received is not the entire image, the camera I/F 252 causes the region image storage unit 263 to store the region image. At this time, for example, the region image corresponding to a predetermined time or older among the region images stored in the region image storage unit 263 is deleted from the region image storage unit 263.

In step S9, the host 203 performs processing using the region image as necessary. For example, the object detection unit 332 performs the processing of detecting an object around the vehicle 10 on the basis of at least one of the entire image stored in the entire image storage unit 262 or the region image stored in the region image storage unit 263. The object detection unit 332 supplies data indicating a result of the processing of detecting an object around the vehicle 10 to, for example, the self-localization unit 132, the map analysis unit 151, the traffic rule recognition unit 152, the situation recognition unit 153, the emergency avoidance unit 171, and the like in FIG. 1.

In step S10, the host 203 records the region image as necessary. For example, the recording control unit 337 causes the drive data storage unit 266 to store the region image received from the camera 201 unconditionally. In this case, for example, in a case where a total time or total capacity of the region images recorded in the drive data storage unit 266 exceeds a predetermined threshold, the recording control unit 337 deletes the region image from the drive data storage unit 266 starting from the old one.

Alternatively, in a case where the vehicle 10 is traveling normally, for example, the recording control unit 337 causes the drive data storage unit 266 to always accumulate the region image corresponding a predetermined time (for example, 30 seconds) before up to the current time, and deletes the region image older than that from the drive data storage unit 266. On the other hand, in a case where abnormality has occurred in the vehicle 10, for example, the recording control unit 337 causes the drive data storage unit 266 to keep the region image corresponding to a predetermined time before up to the time when the abnormality is detected, and causes the drive data storage unit 266 to store the region image corresponding to the time when the abnormality is detected up to after the lapse of a predetermined time (for example, 30 seconds), the abnormality being detection of an impact of predetermined intensity or higher on the vehicle 10 or sudden braking, for example.

As a result, in a case where the host 203 is used as a drive recorder, data necessary for accident analysis or the like is recorded reliably, and the amount of data recorded is reduced.

In step S11, the reception control unit 336 determines whether or not the entire image has been received. In a case where it is determined that the entire image has not been received, the processing returns to step S8.

After that, the processings in steps S8 to S11 are repeatedly executed until it is determined in step S11 that the entire image has been received.

On the other hand, in a case where it is determined in step S11 that the entire image has been received, the processing returns to step S3, and the processings in and after step S3 are executed. That is, the transfer region and frame rate are updated on the basis of the entire image newly received, and the region image is transferred between the camera 201 and the host 203 on the basis of the updated transfer region and frame rate.

<Camera Processing>

Next, the processing of the camera 201 that is executed in response to the processing of the host 203 in FIG. 5 will be described with reference to the flowchart in FIG. 9. Note that this processing is started when, for example, the vehicle 10 is started and an operation to start driving is performed such as when an ignition switch, a power switch, a start switch, or the like of the vehicle 10 is turned on. Moreover, this processing is ended when, for example, an operation to end driving is performed such as when the ignition switch, the power switch, the start switch, or the like of the vehicle 10 is turned off.

Figure 5:
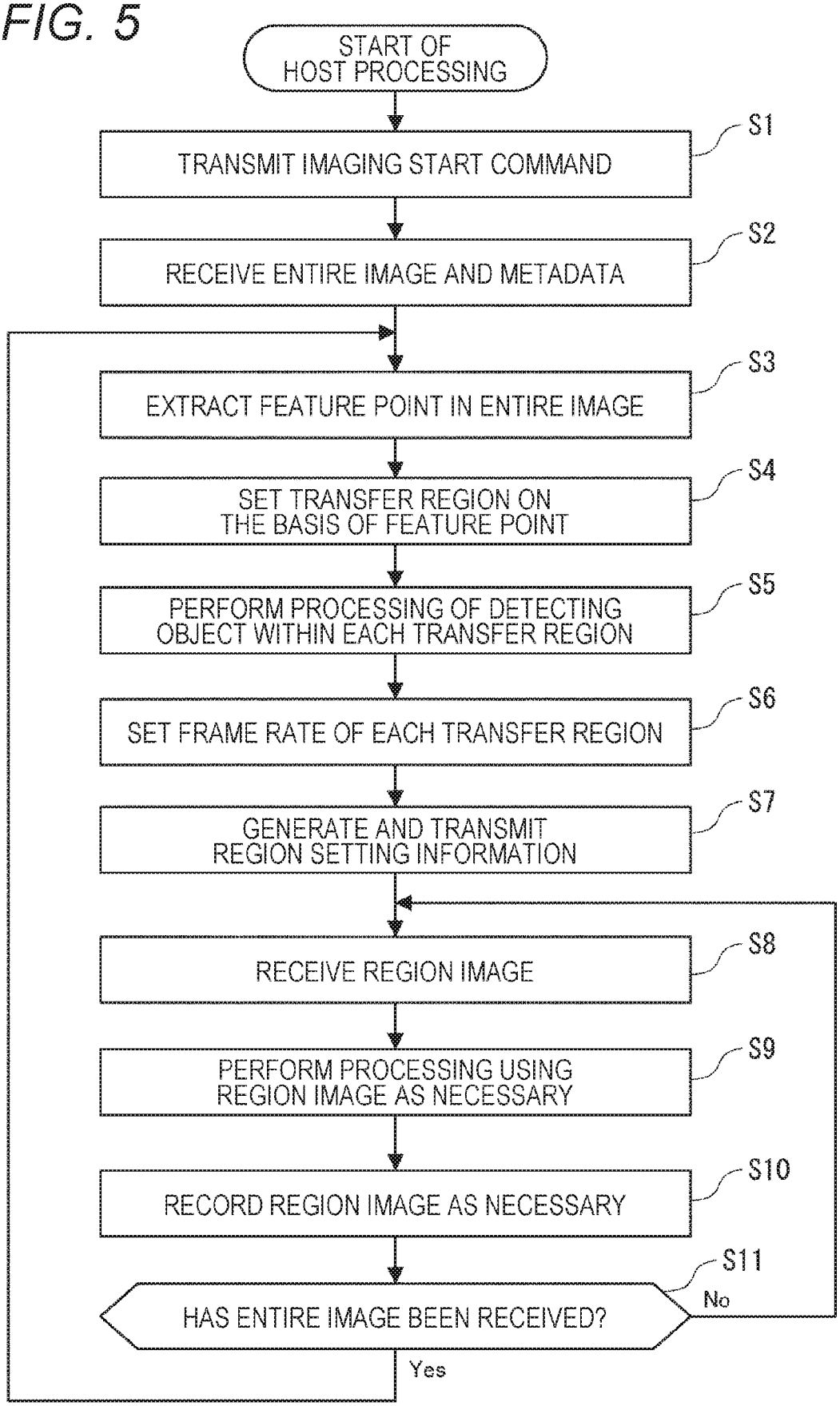
FIG. 5 is a flowchart for explaining a first embodiment of host processing.

In step S51, the reception control unit 304 receives the imaging start command, which is transmitted from the host 203 by the processing in step S1 of FIG. 5, via the host I/F 229.

In step S52, the camera 201 images the surroundings of the vehicle 10. Specifically, the image sensor 221 images the surroundings of the vehicle 10 under the control of the imaging control unit 301, and supplies a surrounding image obtained to the image processing unit 223 via the sensor I/F 222. The image processing unit 223 performs various types of image processing on the surrounding image under the control of the imaging control unit 301, and supplies the surrounding image obtained after the image processing to the color processing unit 224. The color processing unit 224 performs various types of color processing on the surrounding image under the control of the imaging control unit 301, and causes the image storage unit 225 to store the surrounding image obtained after the color processing.

In step S53, the camera 201 transmits an entire image and metadata. Specifically, the region image generation unit 302 copies the surrounding image stored in the image storage unit 225 as is to the buffer 226. The transmission control unit 303 transmits the surrounding image (that is, the entire image) stored in the buffer 226 to the host 203 via the host I/F 229 together with the metadata.

As described above, the metadata includes, for example, the mounting position, mounting orientation, angle of view, exposure parameter, and the like of the camera 201.

In step S54, the reception control unit 304 receives the region setting information, which is transmitted from the host 203 by the processing in step S7 of FIG. 5, via the host I/F 229. The reception control unit 304 causes the region setting information storage unit 228 to store the region setting information received.

In step S55, the imaging control unit 301 sets an imaging rate on the basis of the region setting information. For example, the imaging control unit 301 sets the imaging rate of the image sensor 221 in accordance with the highest frame rate among the frame rates of the transfer regions.

In step S56, the surroundings of the vehicle 10 are imaged as in the processing of step S52. At this time, the surrounding image of a previous frame stored in the image storage unit 225 is overwritten with the surrounding image that is newly imaged.

In step S57, the camera 201 generates and transmits a region image on the basis of the region setting information. Specifically, the region image generation unit 302 detects a transfer region, the region image of which is to be transmitted at the current timing, on the basis of the frame rate of each transfer region included in the region setting information. The region image generation unit 302 generates the region image by extracting, from the surrounding image stored in the image storage unit 225, an image within the transfer region detected and causes the buffer 226 to store the region image. Note that in a case where it is time to transmit the entire image, the region image generation unit 302 copies the surrounding image stored in the image storage unit 225 as is to the buffer 226.

The transmission control unit 303 transmits the region image stored in the buffer 226 to the host 203 via the host I/F 229. As a result, the region image within each transfer region is transmitted at the frame rate indicated by the region setting information.

Figure 10:
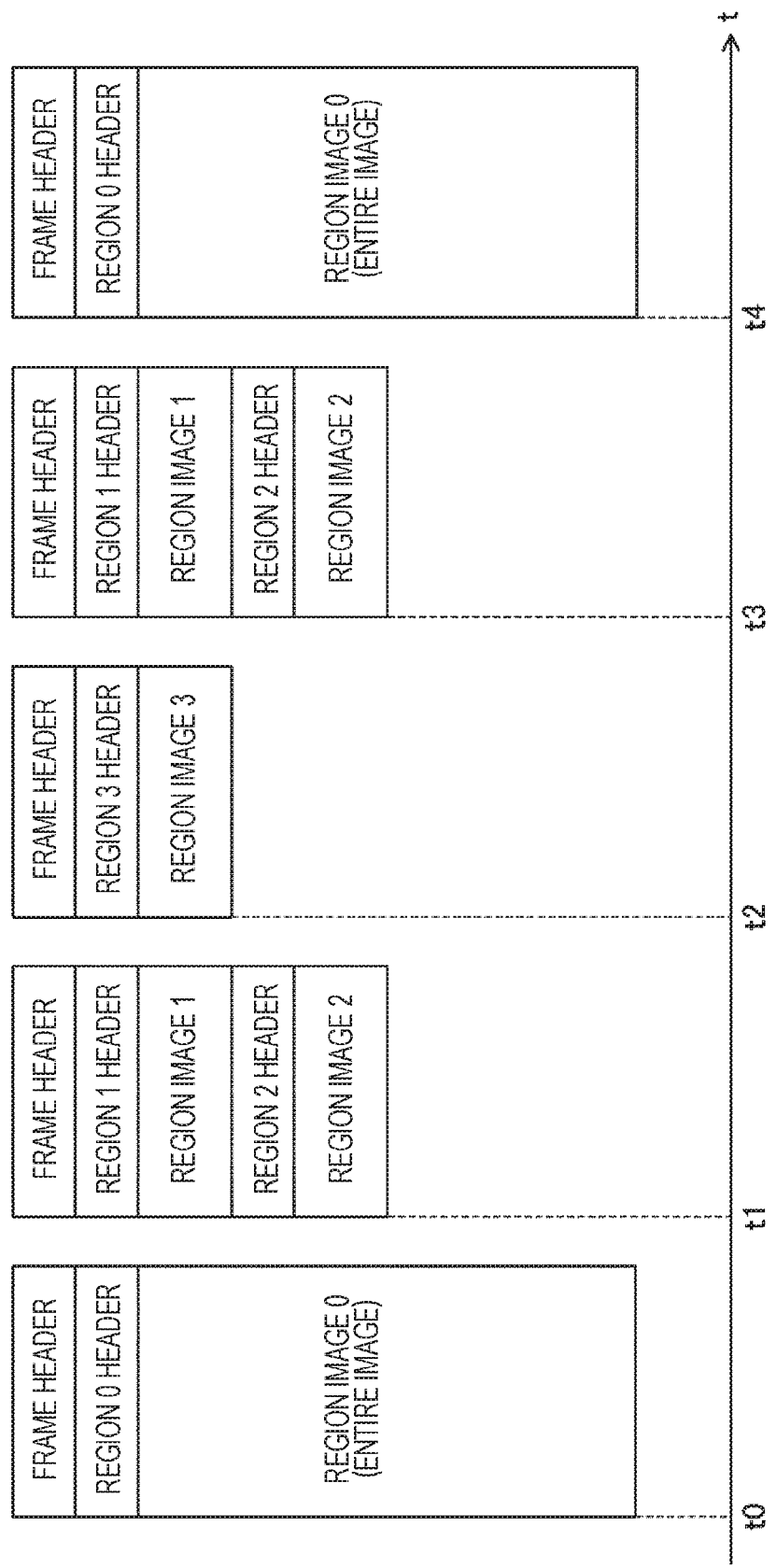
FIG. 10 is a diagram illustrating an example of the configuration of transfer data.

FIG. 10 illustrates an example of the configuration of transfer data when the region image is transmitted from the camera 201 to the host 203.

One transfer data includes a frame header and one or more sets of region header and region image.

The frame header includes, for example, information related to the transfer data such as the number of region images to be transmitted.

The region header includes information related to the transfer region of the region image to be transmitted or the like.

In this example, a region image 0 (entire image) is transmitted at time t0. At time t1 and time t3, a region image 1 and a region image 2 are transmitted. At time t2, a region image 3 is transmitted.

For example, when time t0=0 ms, time t1=20 ms, time t2=25 ms, time t3=40 ms, and time t4=50 ms, the frame rate of the region image 0 is 20 fps. The frame rate of the region image 1 and the region image 2 is 50 fps. This is because the region image 1 and the region image 2 are virtually transmitted by transmitting the region image 0 (entire image) at time t0 and time t4. The frame rate of the region image 3 is 40 fps. This is because the region image 3 is virtually transmitted by transmitting the region image 0 (entire image) at time t0 and time t4.

In step S58, the reception control unit 304 determines whether or not the region setting information has been received. In a case where it is determined that the region setting information has not been received, the processing returns to step S56.

After that, the processings in step S56 to step S58 are repeatedly executed until it is determined in step S58 that the region setting information has been received. That is, the region image within each transfer region is transmitted from the camera 201 to the host 203 on the basis of the frame rate set for each transfer region.

On the other hand, in a case where the region setting information transmitted from the host 203 by the processing in step S7 of FIG. 5 has been received via the host I/F 229 in step S58, the reception control unit 304 determines that the region setting information has been received, and the processing returns to step S55.

After that, the processings in and after step S55 are executed. That is, the imaging rate is updated on the basis of the new region setting information, and generation and transmission of the region image are started.

As described above, the amount of transfer of images between the camera 201 and the host 203 can be reduced. As a result, the capacity and transfer rate of the transfer path between the host I/F 229 and the camera I/F 252 can be reduced.

In addition, the capacity and write speed of the entire image storage unit 262, the region image storage unit 263, and the drive data storage unit 266 can be reduced. Furthermore, in a case where these storage units include a memory with a rewriting life such as a flash memory, for example, the number of times of rewriting of the memory can be reduced so that the life thereof can be extended.

Moreover, since the amount of data of images to be processed is reduced, the performance of a processor included in the control unit 261 can be kept low.

Furthermore, the region image within the transfer region having higher necessity of attention is transmitted at a higher frame rate, so that even if the amount of transfer of images is reduced, a decrease in the accuracy of detecting an object or the like around the vehicle 10 can be prevented.

3. Second Embodiment

Figure 11:
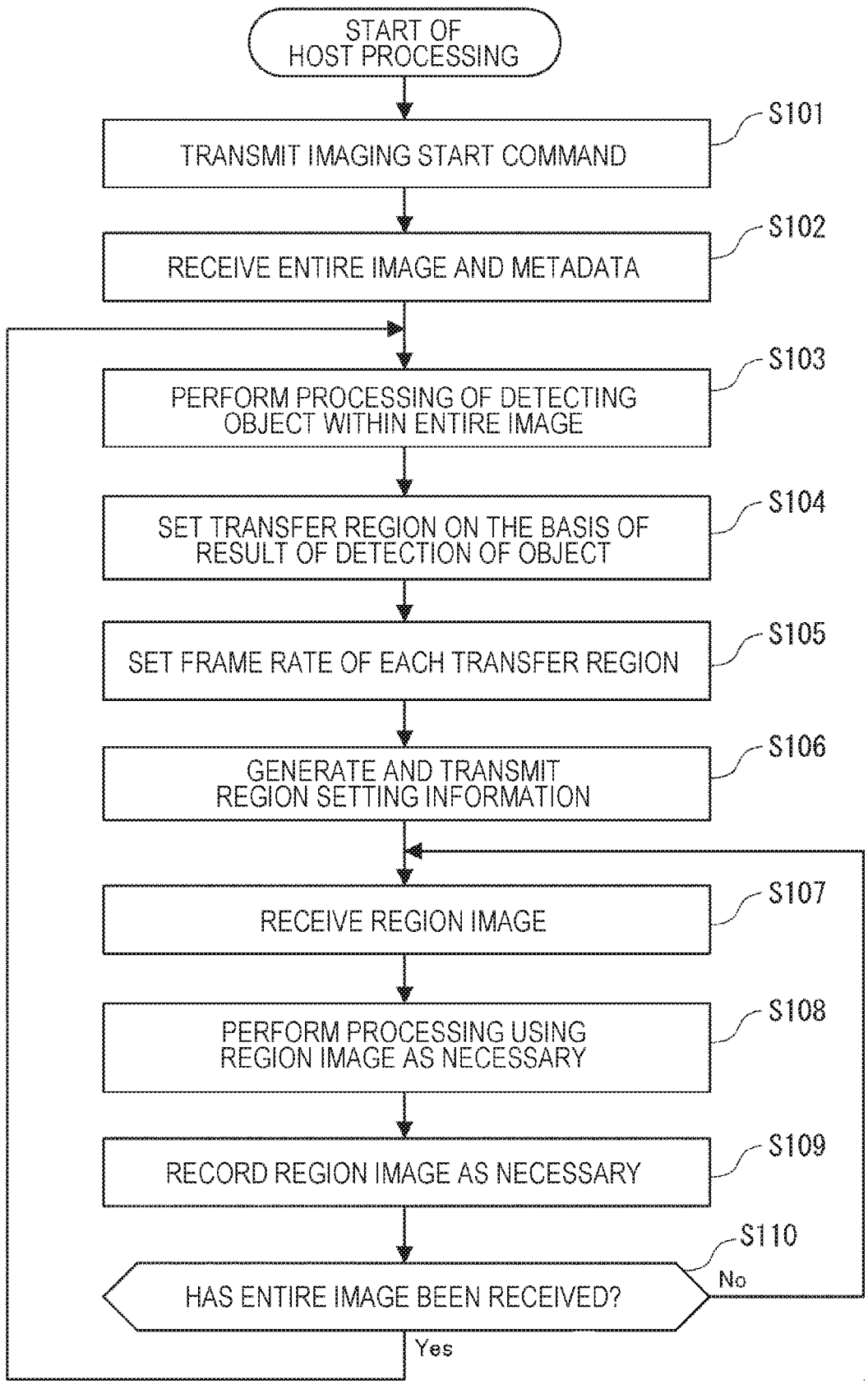
FIG. 11 is a flowchart for explaining a second embodiment of host processing.

Next, a second embodiment of the present technology will be described with reference to FIG. 11.

In the second embodiment, the processing of the host 203 is different from that of the first embodiment.

<Host Processing>

Here, the processing of the host 203 will be described with reference to a flowchart of FIG. 11.

In step S101 and step S102, processings similar to those in step S1 and step S2 of FIG. 5 are performed, respectively.

In step S103, the object detection unit 332 performs processing of detecting an object within an entire image. For example, the object detection unit 332 detects the type, position, movement, or the like of an object within an entire region.

Note that an arbitrary method such as semantic segmentation can be used as a method of detecting the type, position, movement, or the like of an object, for example.

In step S104, the region setting unit 333 sets a transfer region on the basis of a result of the detection of an object. For example, the region setting unit 333 sets, as the transfer region, a region including an object with the necessity of attention among objects detected within the entire image.

Note that the transfer region is not necessarily limited to a rectangular region having sides parallel to sides of the perimeter of the entire image but may be, for example, a rectangle tilted with respect to the sides of the perimeter of the entire image. Moreover, the transfer region need not necessarily be a rectangle.

In step S105, the frame rate setting unit 334 sets the frame rate of each transfer region. For example, the frame rate setting unit 334 sets the frame rate of each transfer region on the basis of the necessity of attention to the object within each transfer region, as in the processing of step S6 in FIG. 5.

After that, in steps S106 to S110, processings similar to those in steps S7 to S11 of FIG. 5 are executed, respectively.

As described above, the transfer region and the frame rate of each transfer region can be set only on the basis of the result of the detection of an object without using feature points.

4. Variation

Hereinafter, a variation of the aforementioned embodiment of the present technology will be described.

The sharing of functions between the camera 201 and the host 203 is not limited to the above example, and can be changed as necessary. For example, the camera 201 may be provided with functions corresponding to the feature point extraction unit 331, the object detection unit 332, and the region setting unit 333 of the host 203, so that the camera 201 may set the transfer region. Also, for example, the camera 201 may be further provided with a function corresponding to the frame rate setting unit 334, so that the camera 201 may set the frame rate of the transfer region.

Moreover, for example, the frame rate of each transfer region may be set on the basis of imaging conditions of the camera 201. For example, the frame rate of each transfer region may be set on the basis of the surrounding weather and brightness. For example, the frame rate of each transfer region may be decreased in a case where the imaging conditions are fine due to good weather, bright surroundings, or the like, and the frame rate of each transfer region may be increased in a case where the imaging conditions are poor due to bad weather (such as rain or fog), dark surroundings, or the like. Also, for example, the frame rate of each transfer region may be set according to time of day. For example, the frame rate of each transfer region may be decreased during daytime hours, and the frame rate of each transfer region may be increased during nighttime hours.

Moreover, in case where the region image is used for self-localization of the vehicle 10 such as SLAM, for example, the frame rate may be set on the basis of feature points. For example, the frame rate is set higher for the transfer region with more feature points, and the frame rate is set lower for the transfer region with fewer feature points.

Moreover, for example, the frame rate of each transfer region may be set on the basis of movement of the vehicle 10. For example, the frame rate of the transfer region closer to the direction of movement of the vehicle 10 may be increased, and the frame rate of the transfer region farther from the direction of movement of the vehicle 10 may be decreased. Also, in a case where the vehicle 10 is traveling at high speed with a small steering angle, for example, the frame rate of the transfer region around the direction of travel of the vehicle 10 may be decreased. On the other hand, in a case where the vehicle 10 is traveling on a curve or an intersection, or in a case where the steering angle of the vehicle 10 is large, the frame rate of the transfer region around the direction of travel of the vehicle 10 may be increased.

Furthermore, although the above description has described an example of the case where there is one camera, the present technology can also be applied to a case where there is a plurality of cameras. In the case where there is a plurality of cameras, for example, the processing described above is performed for each of the cameras, and the region image is transmitted at a frame rate set for each transfer region. However, the processing described above need not necessarily be performed for all the cameras, and some of the cameras may transmit a surrounding image being imaged as is to the host.

Moreover, the present technology can also be applied to a case where the surroundings of various mobile bodies in addition to the vehicle exemplified above are imaged, the various mobile bodies including a motorcycle, a bicycle, personal mobility, an airplane, a ship, construction machinery, agricultural machinery (a tractor), a drone, a robot, and the like.

Furthermore, the present technology can be applied to a case where a captured image imaged by a camera is transferred between the camera and an image processing apparatus such as a host, in addition to the case where the surroundings of a mobile body are imaged. For example, the present technology can also be applied to a case where a captured image is transferred between a surveillance camera installed at a predetermined location and a host provided at a different location from the surveillance camera. In this case as well, for example, a method similar to the method described above is used to set a transfer region of the captured image imaged by the surveillance camera and a frame rate of each transfer region, and to transfer a region image, whereby the amount of transfer of images between the surveillance camera and the host can be reduced.

5. Other

<Example of Configuration of Computer>

The series of processings described above can be executed by hardware or software. In a case where the series of processings is executed by software, a program configuring the software is installed on a computer. Here, the computer includes a computer incorporated in dedicated hardware, a general-purpose personal computer or the like that can execute various functions by installing various programs, or the like.

Figure 12:
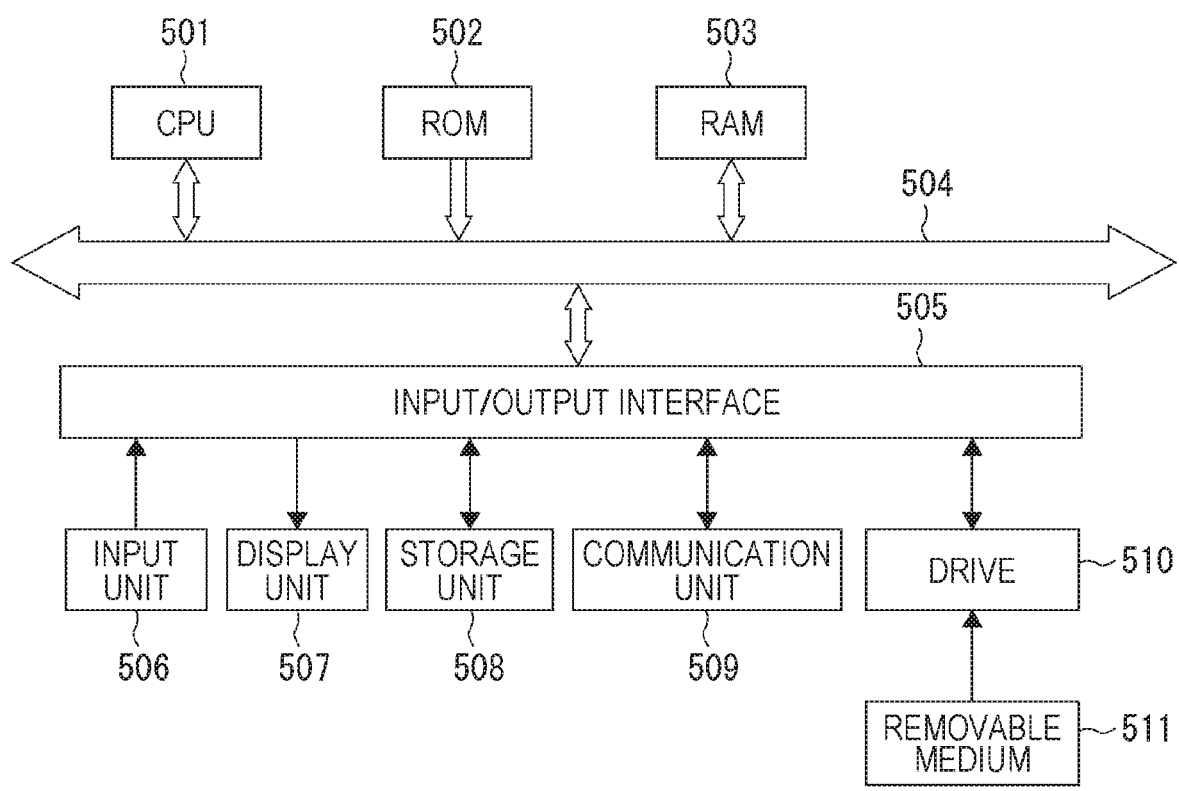
FIG. 12 is a diagram illustrating an example of the configuration of a computer.

FIG. 12 is a block diagram illustrating an example of the configuration of hardware of a computer that executes the series of processings described above according to a program.

In a computer 500, a Central Processing Unit (CPU) 501, a Read Only Memory (ROM) 502, and a Random Access Memory (RAM) 503 are mutually connected via a bus 504.

An input/output interface 505 is also connected to the bus 504. The input/output interface 505 is connected to an input unit 506, an output unit 507, a recording unit 508, a communication unit 509, and a drive 510.

The input unit 506 includes an input switch, a button, a microphone, an image sensor, or the like. The output unit 507 includes a display, a speaker, or the like. The recording unit 508 includes a hard disk, a non-volatile memory, or the like. The communication unit 509 includes a network interface or the like. The drive 510 drives a removable recording medium 511 such as a magnetic disk, an optical disk, a magneto-optical disk, or a semiconductor memory.

In the computer 500 configured as described above, the series of processings described above is performed by, for example, the CPU 501 loading the program recorded in the recording unit 508 to the RAM 503 via the input/output interface 505 and the bus 504, and executing the program.

The program executed by the computer 500 (CPU 501) can be provided while recorded in the removable recording medium 511 as a package medium or the like, for example. The program can also be provided via a wired or wireless transmission medium such as a local area network, the Internet, or digital satellite broadcasting.

In the computer 500, the program can be installed in the recording unit 508 via the input/output interface 505 by placing the removable recording medium 511 in the drive 510. Also, the program can be received by the communication unit 509 via the wired or wireless transmission medium and installed in the recording unit 508. In addition, the program can be installed in advance in the ROM 502 or the recording unit 508.

Note that the program executed by the computer may be a program by which the processing is executed chronologically according to the order described in the present specification, or may be a program by which the processing is executed in parallel or at a required timing such as when a call is made.

Moreover, in the present specification, the system refers to the assembly of a plurality of components (such as devices and modules (parts)), where it does not matter whether or not all the components are housed in the same housing. Accordingly, a plurality of devices housed in separate housings and connected through a network as well as a single device with a plurality of modules housed in a single housing are both a system.

Furthermore, the embodiment of the present technology is not limited to the above-described embodiment but can be modified in various ways without departing from the scope of the present technology.

For example, the present technology can adopt the configuration of cloud computing in which a single function is shared and processed collaboratively among a plurality of devices through a network.

Moreover, each step described in the aforementioned flowcharts can be executed by a single device or can be shared and executed by a plurality of devices.

Furthermore, in a case where a single step includes a plurality of processings, the plurality of processings included in the single step can be executed by a single device or can be shared and executed by a plurality of devices.

<Examples of Combination of Configurations>

The present technology can also have the following configurations.

(1)

An imaging apparatus including:

an imaging unit that performs imaging to obtain a captured image; and a transmission control unit that performs transmission control to transmit a region image within a plurality of transfer regions, which corresponds to an entire or partial region of the captured image, at a frame rate set for each of the transfer regions.

(2)

The imaging apparatus according to (1), in which the transfer regions are each set on the basis of at least one of an object or a feature point within the captured image.

(3)

The imaging apparatus according to (2), further including:

a region setting unit that sets the transfer regions on the basis of at least one of the object or the feature point within the captured image; and a frame rate setting unit that sets the frame rate of each of the transfer regions.

(4)

The imaging apparatus according to (3), further including at least one of:

an object detection unit that detects the object within the captured image; or a feature point extraction unit that extracts the feature point within the captured image, in which the region setting unit sets the transfer regions on the basis of at least one of a result of detection of the object or a result of extraction of the feature point within the captured image.

(5)

The imaging apparatus according to any one of (1) to (4), further including a reception control unit that controls reception of region setting information related to each of the transfer regions and the frame rate of each of the transfer regions, in which the transmission control unit performs transmission control of the region image on the basis of the region setting information.

(6)

The imaging apparatus according to any one of (1) to (5), further including an imaging control unit that sets an imaging rate of the imaging unit on the basis of the frame rate of each of the transfer regions.

(7)

The imaging apparatus according to (6), in which the imaging control unit sets the imaging rate of the imaging unit according to the frame rate that is the highest frame rate among the frame rates of the transfer regions.

(8)

The imaging apparatus according to any one of (1) to (7), in which the imaging apparatus is provided in a mobile body, and the captured image is an image obtained by imaging the surroundings of the mobile body.

(9)

An image processing method, in which an imaging apparatus performs:

imaging to obtain a captured image; and transmission control to transmit a region image within a plurality of transfer regions, which corresponds to an entire or partial region of the captured image, at a frame rate set for each of the transfer regions.

(10)

An image processing apparatus including:

a region setting unit that sets a plurality of transfer regions, which corresponds to an entire or partial region of a captured image imaged by an imaging apparatus, on the basis of at least one of an object or a feature point within the captured image;

a frame rate setting unit that sets a frame rate of each of the transfer regions;

a transmission control unit that controls transmission of region setting information to the imaging apparatus, the region setting information being related to each of the transfer regions and the frame rate of each of the transfer regions; and a reception control unit that controls reception of a region image within each of the transfer regions transmitted from the imaging apparatus at a frame rate based on the region setting information.

(11)

The image processing apparatus according to (10), further including at least one of:

an object detection unit that detects the object within the captured image; or a feature point extraction unit that extracts the feature point within the captured image, in which the region setting unit sets the transfer regions on the basis of at least one of a result of detection of the object or a result of extraction of the feature point within the captured image.

(12)

The image processing apparatus according to (11), in which the frame rate setting unit sets the frame rate of each of the transfer regions on the basis of at least one of a result of detection of an object within each of the transfer regions or a result of extraction of a feature point within each of the transfer regions.

(13)

The image processing apparatus according to (12), in which the frame rate setting unit sets the frame rate of each of the transfer regions on the basis of at least one of a type, position, or movement of the object within each of the transfer regions.

(14)

The image processing apparatus according to (13), in which the frame rate setting unit sets the frame rate of each of the transfer regions also on the basis of an imaging condition of the imaging apparatus.

(15)

The image processing apparatus according to (11), in which the frame rate setting unit sets the frame rate of each of the transfer regions on the basis of at least one of a result of detection of an object within each of the transfer regions, a result of extraction of a feature point within each of the transfer regions, or a movement of a mobile body in which the imaging apparatus is provided.

(16)

The image processing apparatus according to any one of (10) to (15), in which the frame rate setting unit sets the frame rate of the transfer region, which corresponds to the entire region of the captured image, to be lower than or equal to the lowest frame rate among the frame rates of the transfer regions each corresponding to the partial region of the captured image.

(17)

The image processing apparatus according to any one of (10) to (16), further including a recording control unit that controls recording of each of the region images.

(18)

The image processing apparatus according to any one of (10) to (17), in which the imaging apparatus is provided in the mobile body, and the captured image is an image obtained by imaging the surroundings of the mobile body.

(19) An image processing method, in which an image processing apparatus performs:

setting of a plurality of transfer regions, which corresponds to an entire or partial region of a captured image imaged by an imaging apparatus, on the basis of at least one of an object or a feature point within the captured image;

setting of a frame rate of each of the transfer regions;

control of transmission of region setting information to the imaging apparatus, the region setting information being related to each of the transfer regions and the frame rate of each of the transfer regions; and control of reception of a region image within each of the transfer regions transmitted from the imaging apparatus at a frame rate based on the region setting information.

Note that the effect described in the present specification is provided by way of example and not by way of limitation, where there may be another effect.

REFERENCE SIGNS LIST

10 Vehicle
100 Vehicle control system
102 Data acquisition unit
141 Extra-vehicle information detecting unit
201 Camera
203 Host
221 Image sensor
227 Control unit
229 Host I/F
251 Image processing unit
252 Camera I/F
261 Control unit
301 Imaging control unit
302 Region image generation unit
303 Transmission control unit
304 Reception control unit
331 Feature point extraction unit
332 Object detection unit
333 Region setting unit
334 Frame rate setting unit
335 Transmission control unit
336 Reception control unit
337 Recording control unit

The invention claimed is:

1. An imaging apparatus comprising:
a camera that obtains a captured image surrounding a mobile body, the captured image including information regarding a feature point or an object;
control circuitry configured to control transmission of a region image within a plurality of transfer regions, which corresponds to an entire or partial region of the captured image, to set transfer regions on a basis of at least one of the object or the feature point within the captured image and to set a frame rate for each of the transfer regions based on a level of risk of the at least one of the object and the feature point within the captured image; and
an interface that transmits region images from the camera via a communication network that connects other circuitry of a control system of the mobile body.

2. The imaging apparatus according to claim 1, wherein the control circuitry is configured to:

set the transfer regions on a basis of at least one of the object or the feature point within the captured image; and
set the frame rate of each of the transfer regions.

3. The imaging apparatus according to claim 2 wherein the control circuitry is configured to perform at least one of:
detect the object within the captured image; or
extract the feature point within the captured image, wherein
the control circuitry is configured to set the transfer regions on a basis of at least one of a result of detection of the object or a result of extraction of the feature point within the captured image.

4. The imaging apparatus according to claim 1, wherein the control circuitry is configured to:
control reception of region setting information related to each of the transfer regions and the frame rate of each of the transfer regions, and
perform transmission control of the region image on a basis of the region setting information.

5. The imaging apparatus according to claim 1, further comprising
camera control circuitry configured to set an imaging rate of the camera on a basis of the frame rate of each of the transfer regions.

6. The imaging apparatus according to claim 5, wherein the camera control circuitry is configured to set the imaging rate of the camera according to the frame rate that is a highest frame rate among the frame rates of the transfer regions.

7. The imaging apparatus according to claim 1, wherein the camera is in the mobile body.

8. An image processing method, the method comprising:
obtaining a captured image surrounding a mobile body, the captured image including information regarding a feature point or an object;
setting each of a plurality of transfer regions on a basis of at least one of the object or the feature point within the captured image;
setting of a frame rate of each of the transfer regions based on a level of risk of the at least one of the object and the feature point within the captured image;
setting of a frame rate of each of the transfer regions based on a level of risk of the at least one of the object and the feature point within the captured image
controlling transmission of a region image within the plurality of transfer regions, which corresponds to an entire or partial region of the captured image, at the frame rate set for each of the transfer regions; and
transmitting region images via a communication network that connects other circuitry of a control system of the mobile body.

9. An image processing apparatus comprising:
control circuitry configured to:
set a plurality of transfer regions, which corresponds to an entire or partial region of a captured image surrounding a mobile body imaged by a camera, the captured image including information regarding a feature point or an object, on a basis of at least one of the object or the feature point within the captured image;
set a frame rate of each of the transfer regions based on a level of risk of the at least one of the object and the feature point within the captured image;
control transmission of region setting information to the camera, the region setting information being related to each of the transfer regions and the frame rate of each of the transfer regions; and control reception of a region image within each of the transfer regions transmitted from the camera at a frame rate based on the region setting information; and an interface that transmits region images from the camera via a communication network that connects other circuitry of a control system of the mobile body.

10. The image processing apparatus according to claim 9, wherein the control circuitry is further configured to perform at least one of:

detect the object within the captured image; or extract the feature point within the captured image, wherein control circuitry is configured to set the transfer regions on a basis of at least one of a result of detection of the object or a result of extraction of the feature point within the captured image.

11. The image processing apparatus according to claim 10, wherein the control circuitry configured to set the frame rate of each of the transfer regions on a basis of at least one of a result of detection of an object within each of the transfer regions or a result of extraction of a feature point within each of the transfer regions.

12. The image processing apparatus according to claim 11, wherein the control circuitry is configured to set the frame rate of each of the transfer regions on a basis of at least one of a type, position, or movement of the object within each of the transfer regions.

13. The image processing apparatus according to claim 12, wherein the control circuitry is configured to set the frame rate of each of the transfer regions also on a basis of an imaging condition of the camera.

14. The image processing apparatus according to claim 10, wherein the control circuitry is configured to set the frame rate of each of the transfer regions on a basis of at least one of a result of detection of an object within each of the transfer regions, a result of extraction of a feature point within each of the transfer regions, or a movement of the mobile body.

15. The image processing apparatus according to claim 9, wherein the control circuitry is configured to set the frame rate of the transfer region, which corresponds to the entire region of the captured image, to be lower than or equal to a lowest frame rate among the frame rates of the transfer regions each corresponding to the partial region of the captured image.

16. The image processing apparatus according to claim 9, wherein the control circuitry is further configured to control recording of each region image.

17. The image processing apparatus according to claim 9, wherein the camera is provided in the mobile body.

18. An image processing method, wherein the method comprising:

setting of a plurality of transfer regions, which corresponds to an entire or partial region of a captured image surrounding a mobile body imaged by a camera, the captured image including information regarding a feature point or an object, on a basis of at least one of the object or the feature point within the captured image;

setting of a frame rate of each of the transfer regions based on a level of risk of the at least one of the object and the feature point within the captured image;

controlling transmission of region setting information to the camera, the region setting information being related to each of the transfer regions and the frame rate of each of the transfer regions;

controlling reception of a region image within each of the transfer regions transmitted from the camera at a frame rate based on the region setting information; and transmitting region images via a communication network that connects other circuitry of a control system of the mobile body.

\* \* \* \* \*